United States Patent
Kempe et al.

(10) Patent No.: US 10,931,506 B2
(45) Date of Patent: *Feb. 23, 2021

(54) NETWORK VISUALIZATION SERVICE

(71) Applicant: Amazon Technologies, Inc., Seattle, WA (US)

(72) Inventors: Gregory Jonathan Kempe, Cape Town (ZA); Ronen Dov Agranat, Cape Town (ZA); Malcolm Featonby, Cape Town (ZA); Joshua Mentz, Cape Town (ZA); Timothy Ralph Sjoberg, Cape Town (ZA); Willem Jacob Buys, Cape Town (ZA)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/672,325

(22) Filed: Nov. 1, 2019

(65) Prior Publication Data
US 2020/0127881 A1 Apr. 23, 2020

Related U.S. Application Data

(63) Continuation of application No. 13/743,095, filed on Jan. 16, 2013, now Pat. No. 10,469,304.

(51) Int. Cl.
*G06F 15/173* (2006.01)
*H04L 12/24* (2006.01)
(Continued)

(52) U.S. Cl.
CPC ............ *H04L 41/00* (2013.01); *H04L 41/12* (2013.01); *H04L 41/22* (2013.01);
(Continued)

(58) Field of Classification Search
None
See application file for complete search history.

(56) References Cited

U.S. PATENT DOCUMENTS

| 2006/0190454 A1 | 8/2006 | Kato et al. |
| 2010/0030677 A1 | 2/2010 | Melik-Aslanian et al. |

(Continued)

OTHER PUBLICATIONS

"Amazon CloudWatch" Amazon Web Services, downloaded on Jan. 16, 2013 from aws.amazon.com/cloudwatch/.
(Continued)

*Primary Examiner* — Padma Mundur
(74) *Attorney, Agent, or Firm* — Robert C. Kowert; Kowert, Hood, Munyon, Rankin & Goetzel, P.C.

(57) ABSTRACT

A network visualization service may auto-generate graphical, dynamic, and interactive network diagrams of the infrastructure (resource instances, connections, etc.) of clients' virtual private networks as implemented on a provider network. A network diagram may include representations of various virtualized components of a client's virtual private network, as well as relationships among and connections between and among the various components. The diagram may also display logical and/or geographical groupings of the virtual resources in the client's virtual private network. The service may track changes to the virtual private network and update the diagram accordingly. The diagram may provide a user interface via which the client may select particular graphical objects on diagram to display additional information about a respective resource instance or connection and/or to change the client's virtual private network configuration via the network diagram.

20 Claims, 19 Drawing Sheets

(51) Int. Cl.
*H04L 29/08* (2006.01)
*H04L 29/06* (2006.01)
*H04L 12/26* (2006.01)

(52) U.S. Cl.
CPC .......... *H04L 41/5096* (2013.01); *H04L 63/08* (2013.01); *H04L 67/1008* (2013.01); *H04L 43/0864* (2013.01); *H04L 43/0888* (2013.01)

(56) References Cited

U.S. PATENT DOCUMENTS

| | | |
|---|---|---|
| 2011/0029882 A1 | 2/2011 | Jaisinghani |
| 2011/0289207 A1 | 11/2011 | Liu et al. |
| 2012/0030572 A1 | 2/2012 | Karenos et al. |
| 2013/0013738 A1 | 1/2013 | Astete et al. |
| 2014/0201642 A1* | 7/2014 | Vicat-Blanc ............ H04L 41/22 715/736 |

OTHER PUBLICATIONS

"Amazon Virtual Private Cloud" Amazon Web Services, downloaded on Jan. 16t, 2013 from aws.amazon.com/vpc/#details.
"AWS Management Console" Amazon Web Services, downloaded on Jan. 16, 2013 from aws.amazon.com/console.
Deborah Estrin, Mark Handley, John Heidemann, Steven McCanne, Ya Xu, Haobo Yu, "Network Visualization with Nam, the VINT Network Animator" 2000 IEEE, Nov. 2000.
Web document, "Virtual Private Cloud", Wikipedia, Jul. 28, 2008, p. 1.
Web document, "Amazon to soothe enterprise fears with virtual private cloud", Aug. 27, 2009, pp. 1-4.

* cited by examiner

NETWORK VISUALIZATION SERVICE

This application is a continuation of U.S. patent application Ser. No. 13/743,095, filed Jan. 16, 2013, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
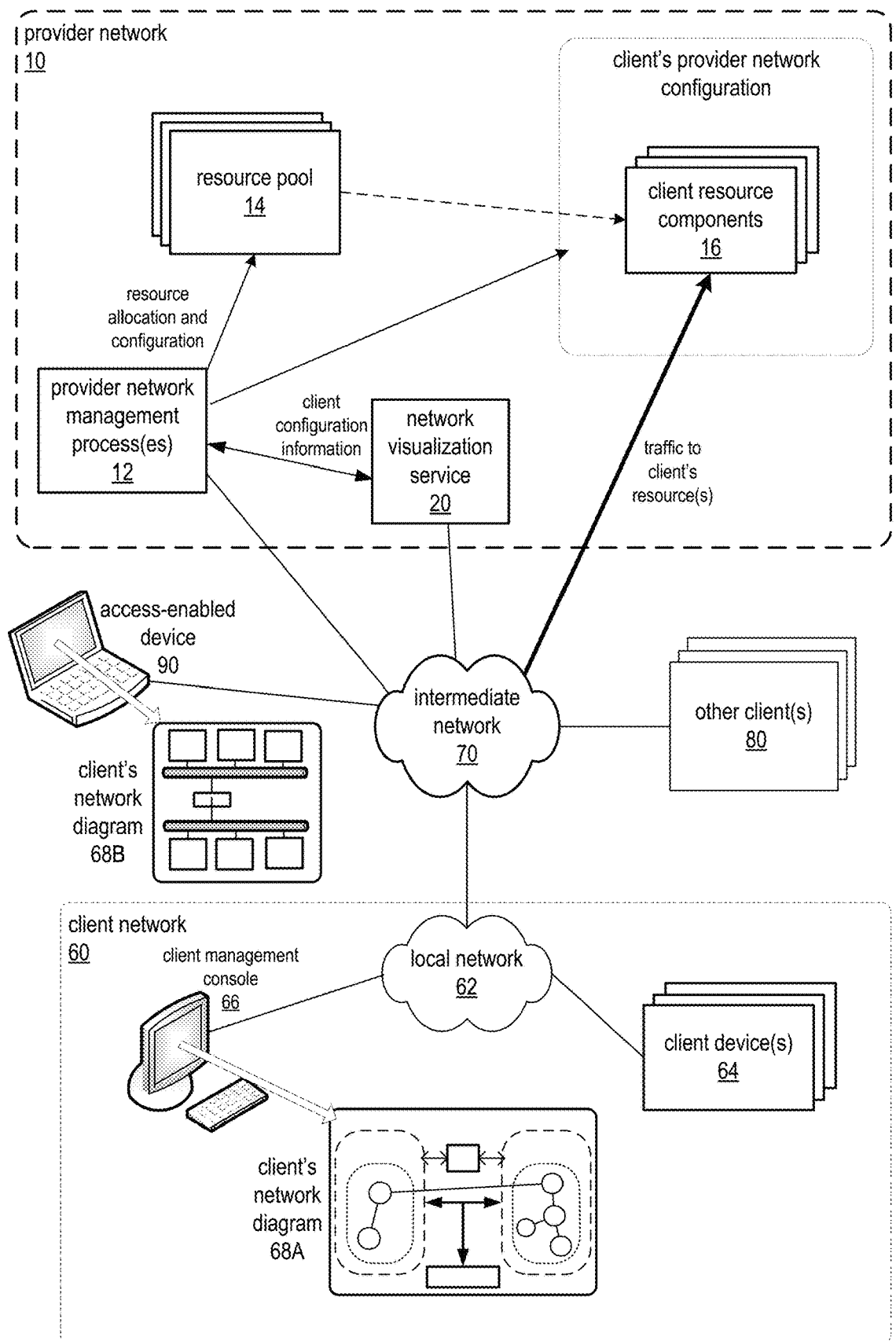
FIG. 1 illustrates an example provider network environment in which embodiments of a network visualization service and the dynamic and interactive client private network diagrams provided thereby may be implemented.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for providing dynamic and interactive graphical displays of clients' virtual private network infrastructures and configurations in provider network environments are described. Conventionally, information about a client's configuration on a provider network has been provided in tabular/textual formats. A network visualization service is described that may autogenerate a graphical, dynamic, and interactive network diagram of the infrastructure (resource instances, connections, etc.) of a client's virtual private network as implemented on the provider network. The network diagram may, for example, be provided by the network visualization service to a physical console at the client's external network for display on the console, or to other access-enabled devices for display on the devices. The network diagram may include representations of various components of the client's virtual private network including but not limited to representations of compute instances, data storages (e.g., block-based storage volumes), databases, queues, virtual appliances, routers, load balancers, and other virtual components of the client's virtual private network, as well as relationships among and connections between and among the various components. In at least some embodiments, the network diagram may also display logical and/or physical/geographical groupings of the virtual resources in the client's virtual private network, such as security groups, availability zones, and geographic regions. Embodiments of the network visualization service and the network diagram provided thereby may make visualizing the client's provider network infrastructure and architectural organization much easier than the conventional tabular/textual formats, for example allowing the client to easily detect architectural vulnerabilities.

In at least some embodiments, the network diagram may be dynamic. That is, the network visualization service may track events and changes to the client's virtual private network, and update the network diagram accordingly. For example, the client may, through a management process or service interface provided by the provider network, add, remove, or change the configuration of one or more resource instances on the client's private network. The network visualization service may monitor other processes or services on the provider network, detect the changes, and update a displayed network diagram accordingly. As another example, the provider network may generate events such as maintenance events or downtime that may affect the client's private network; the network visualization service may detect or be informed of these events and update the displayed network diagram to indicate to the client the change in status of the client's private network. For example, a maintenance schedule (date/time) may be displayed for one or more affected resources, or temporarily unavailable resource instances may be indicated by a color change to the respective graphical representations of the resource instances or by other graphical or textual means.

In at least some embodiments, the network diagram may be interactive. For example, the client may use the cursor or other user interface methods to select particular graphical objects on the network diagram to, for example, display additional information about a respective resource instance or connection. As another example, the client may use the cursor or other user interface methods to change the client's virtual private network configuration via the network diagram. For example, the client may drag-and-drop a representation of a resource instance from one security group into another, or from one availability zone to another. As another example, the client may drag-and-drop a data volume onto a compute instance to mount the data volume on the respective instance. In at least some embodiments, the client may use one or more interface methods to delete, add, or copy resource instances, change connections, move resource instances to different logical or geographical groupings, and to perform various other configuration tasks. The network visualization service may detect the change(s) to the network diagram made by the client and inform the appropriate process(es) or service(s) on the provider network, for example via APIs to the process(es) or service(s), of the change(s) to the virtual private network configuration as indicated by the client via the network diagram. The process(es) or service(s) of the provider network may then perform the actual reconfiguration of the client's virtual resources on the provider network to affect the change(s).

Figure 13:
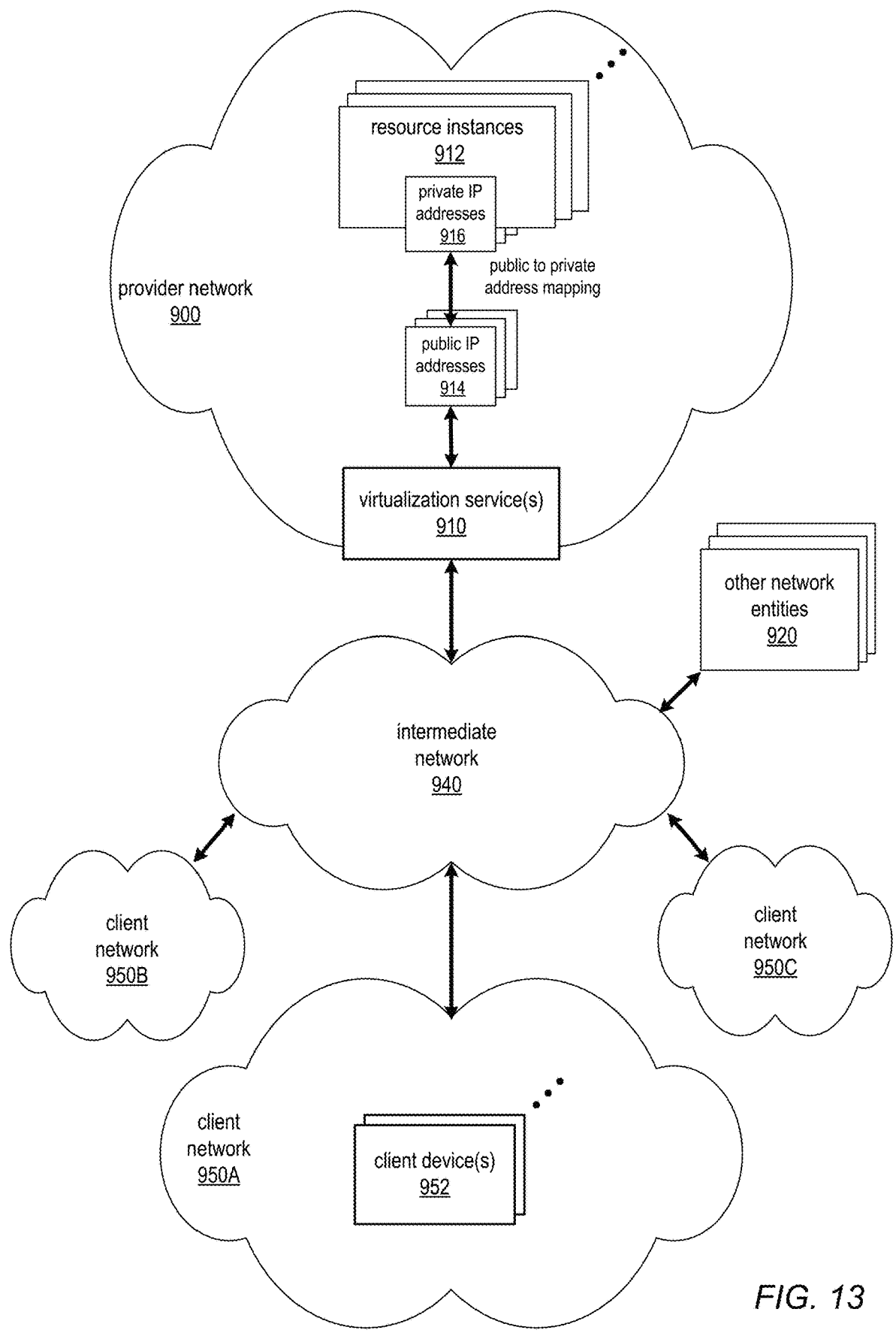
FIG. 13 illustrates an example provider network environment, according to at least some embodiments.
Figure 14:
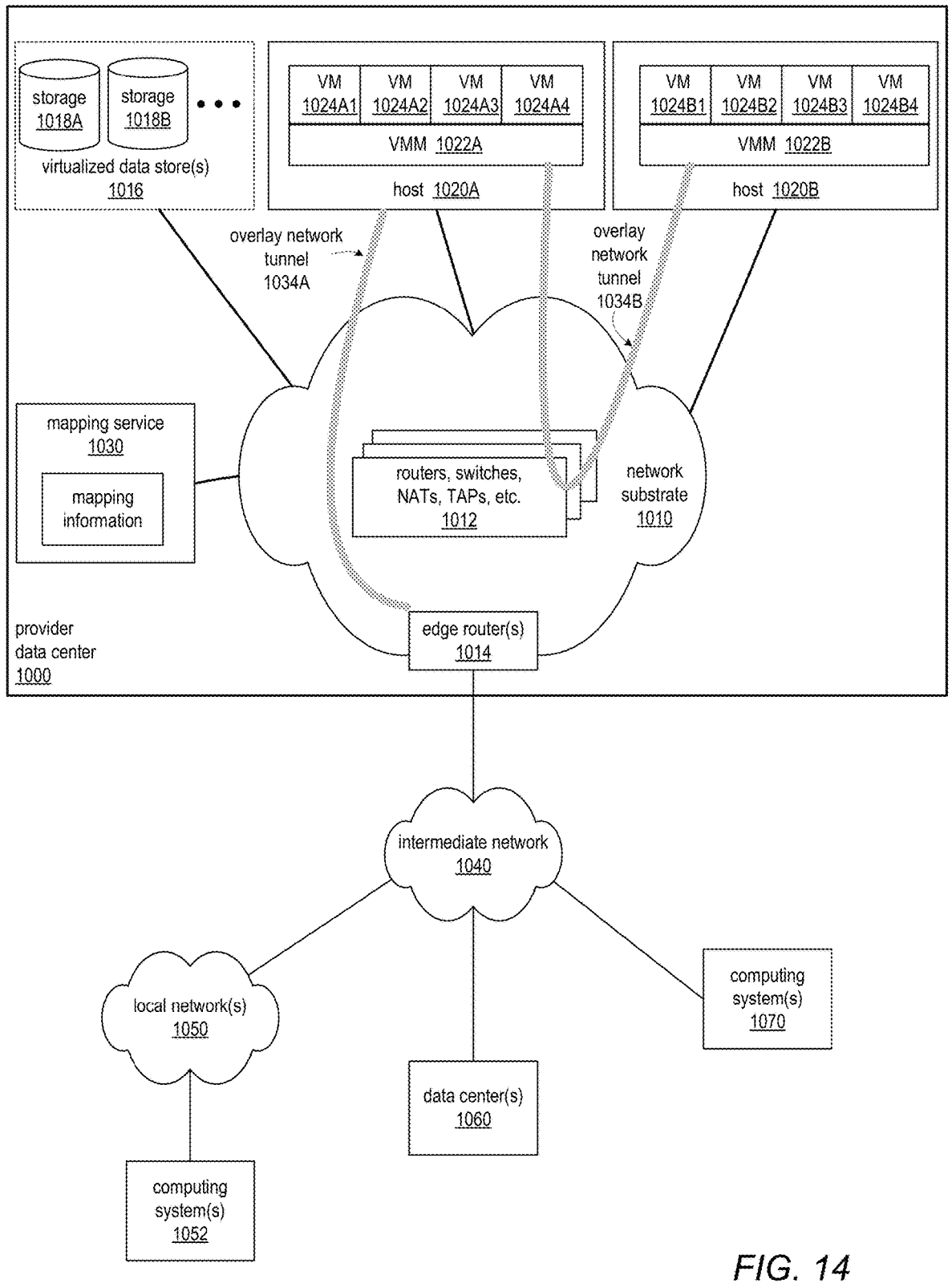
FIG. 14 illustrates an example data center that implements an overlay network on a network substrate using IP tunneling technology, according to some embodiments.

FIGS. 13 through 19 and the section titled Example provider network environments illustrate and describe example environments in which embodiments of the methods and apparatus as described herein may be implemented, and are not intended to be limiting. In at least some embodiments, at least some of the resources provided to the clients of the service provider via the provider network may be virtualized computing resources implemented on multi-tenant hardware that is shared with other client(s) and/or on hardware dedicated to the particular client, as illustrated in FIGS. 13 through 19. Each virtualized computing resource (e.g., a virtual machine (VM) 1024 or virtualized storage 1018 as shown in FIG. 14) may be referred to as a resource instance. Note, however, that in at least some provider network implementations at least some of the resources that are provided to clients may be actual physical devices such as server systems or other types of computing or networking devices. In this document, the term "component" may be used to refer to any resource on a provider network that may be provided to a client, where "component" refers to either a virtualized computing resource (e.g., a VM, or a virtualized data volume) that may be configured to perform some function or to a physical resource such as a device or system that may be configured to perform some function. Clients of the service provider may access various services of the provider network via APIs to the services to obtain various resource components and to establish and manage virtual network configurations that include the components, for example virtual private networks as described herein. Embodiments of the network visualization service as described herein may be provided by the service provider and accessed by the clients of the service provider to display and view graphical representations of the client's virtual network configurations (referred to as network diagrams) on the provider network, and to manage or reconfigure the virtual configurations via various user interface manipulations of the graphical representations.

While the network visualization service is generally described herein as being accessed by clients of the provider network to view graphical representations of the clients' virtual network configurations on the provider network, it is to be noted that the network visualization service may be accessed by agents of the service provider to view and manage clients' virtual network configurations as well.

FIGS. 1 through 12 illustrate various aspects and operations of embodiments of the network visualization service and the network diagrams provided thereby.

FIG. 1 illustrates an example client configuration on an example provider network implementation in which embodiments of the network visualization service and the network diagrams provided thereby may be implemented, and is not intended to be limiting. A client network 60 may couple to a provider network 10 via an intermediate network 50. Note that other client(s) 80 may also couple to the provider network 10 via the intermediate network 50. The client network 60 may include a local network 62 to which one or more client devices 64 are coupled. The client network may also include a client management console 66. The client network 60 may be operated by a client of the service provider that provides and operates the provider network 10. The provider network 10 may include provider network management process(es) 12 that may be accessed from the client management console 66, for example via one or more user interfaces to the management process(es) 12 displayable on the client management console 66. By accessing the management process(es) 12 via the client management console 66, the client may obtain (e.g., purchase, rent, or lease), configure, and manage resource components 16, including but not limited to computation and storage resource components, load balancer components, router components, gateway components, and appliance components on the provider network 10. In at least some embodiments, upon receiving a request for a resource component 16 from the client, the management process(es) 12 may cause a resource component 16 to be allocated to and configured for the client on the provider network 10. In at least some embodiments, the resource component 16 may be allocated from a resource component pool 14. Note that, in at least some embodiments, a resource component 16 may be provided to client(s) via APIs to one or more services on the provider network 10 such as a load balancer service, a router service, a storage virtualization service, or a hardware virtualization service (see FIG. 15). In these embodiments, the user interface(s) may include user interface(s) to the respective service, and may be provided via the management process(es) 12 or via the respective service (e.g., via a load balancer service).

A provider network such as provider network 10 in FIG. 1 may include subnetworks, or subnets, that each includes a set of logically isolated network components. The subnets may, for example, be used to logically separate the components of computation and storage virtualization services, load balancer services, router services, appliance services, and so on from the open network. A service provider may also enable clients, including but not limited to third-party operators of various services provided on the provider network, to create virtual private networks on the service network using subnets. A private network is a set of logically separated resource components on the provider network that are allocated to a given client. In at least some embodiments, the resource components may be implemented as virtualized computing resources on multi-tenant hardware that is shared with other client(s) 80 and/or on hardware dedicated to the particular client. However, note that the resource components may also be or may include physical resources such as devices or systems that may be configured to perform some function. Note that a client may instead or also have resource components on the provider network that are not located in private networks.

In at least some embodiments, a private network may itself include one or more subnets. For example, a client's private network may be subdivided into a public-facing subnet and a private-facing subnet, or into other numbers and combinations of public-facing and/or private-facing subnets. The client may have control over network functionality of the subnet(s) in the client's private network, for example controlling incoming and outgoing network traffic. A private network may, for example, enable a client to connect existing infrastructure on the client's network 60 to the logically isolated resource instances in the subnet(s) of the private network, and to extend management capabilities such as security services, firewalls, and intrusion detection systems to include the client's resource instances in the subnet(s) of the private network. As another example, private networks may be used by third parties and/or by the service provider to provide appliance services or other services on the service provider network.

Figure 16:
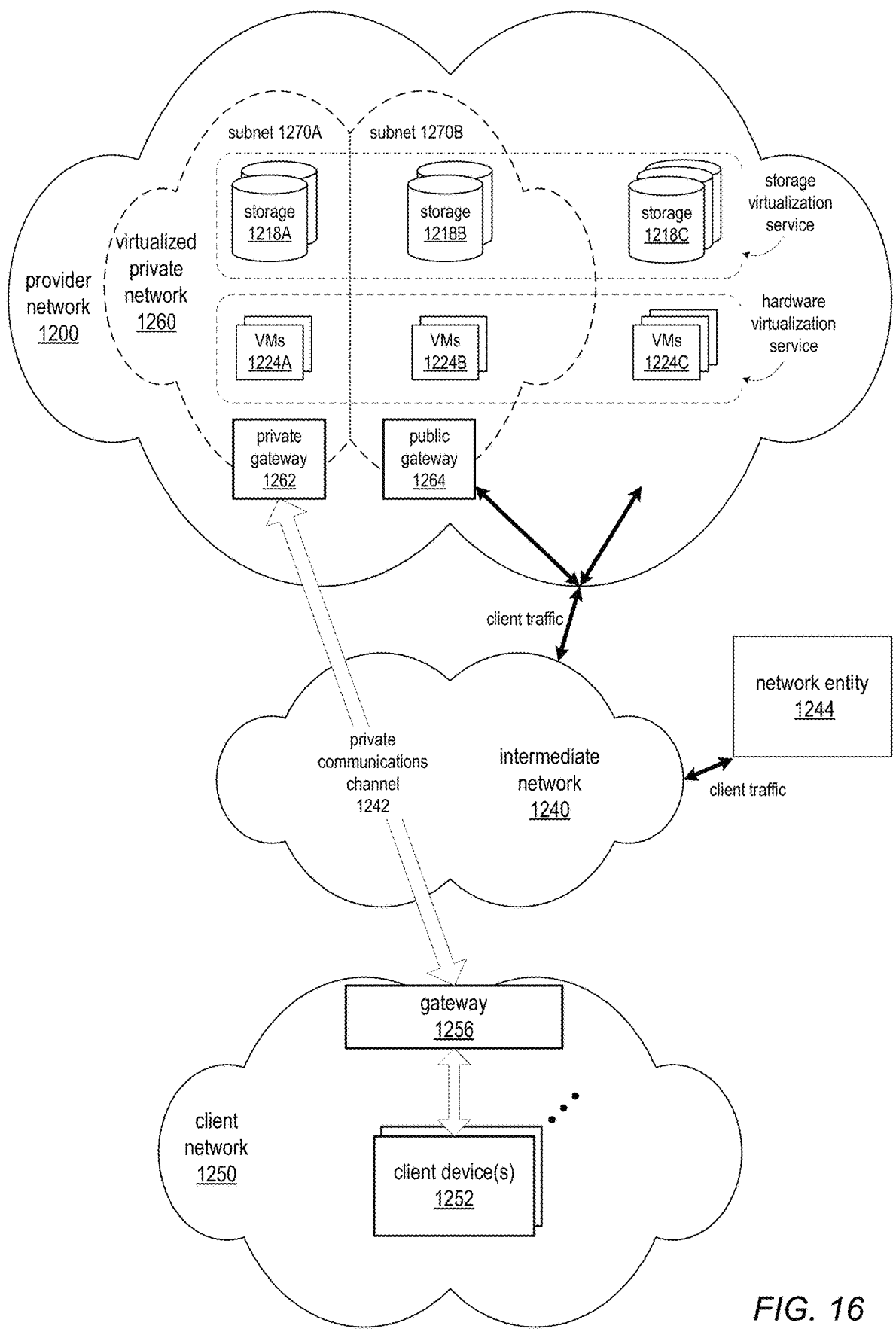
FIG. 16 illustrates an example provider network that provides virtualized private networks to at least some clients, according to at least some embodiments.

For further illustration and discussion of private networks and subnets, see FIG. 16 and the discussion thereof in the section titled Example provider network environments.

In at least some embodiments, a provider network such as provider network 10 in FIG. 1 may allow clients to establish and manage virtual security groups within private networks, within or across subnets. A security group acts as a firewall that controls the traffic allowed to reach one or more resource instances within the security group. Via the provider network management process(es) 12, the client may establish one or more security groups within a private network, and may associate each resource instance in the private network with one or more security groups. In at least some embodiments, the client may establish and/or modify rules for each security group that control the inbound traffic allowed to reach the resource instances associated with the security group. All other inbound traffic is discarded. For further illustration and discussion of security groups, see FIG. 17 and the discussion thereof in the section titled Example provider network environments.

In at least some embodiments, a provider network such as provider network 10 in FIG. 1 may be divided into different geographic locations and/or zones, and may allow clients to allocate resource instances in and/or to implement virtual private networks across multiple locations and/or zones. For example, a provider network may be implemented as one or more geographically dispersed regions (geographic areas, countries, etc.), with each region subdivided into one or more availability zones. An availability zone may be defined as a distinct location or zone engineered to be insulated from failures in other availability zones. Each availability zone may provide network connectivity to other availability zones in the same region. By establishing resource instances in separate availability zones, a client may protect their applications from failure at a single location. For further illustration and discussion of regions and availability zones of a provider network and their relation to clients' private networks, see FIGS. 18 through 20 and the discussion thereof in the section titled Example provider network environments.

Network Visualization Service

Figure 21:
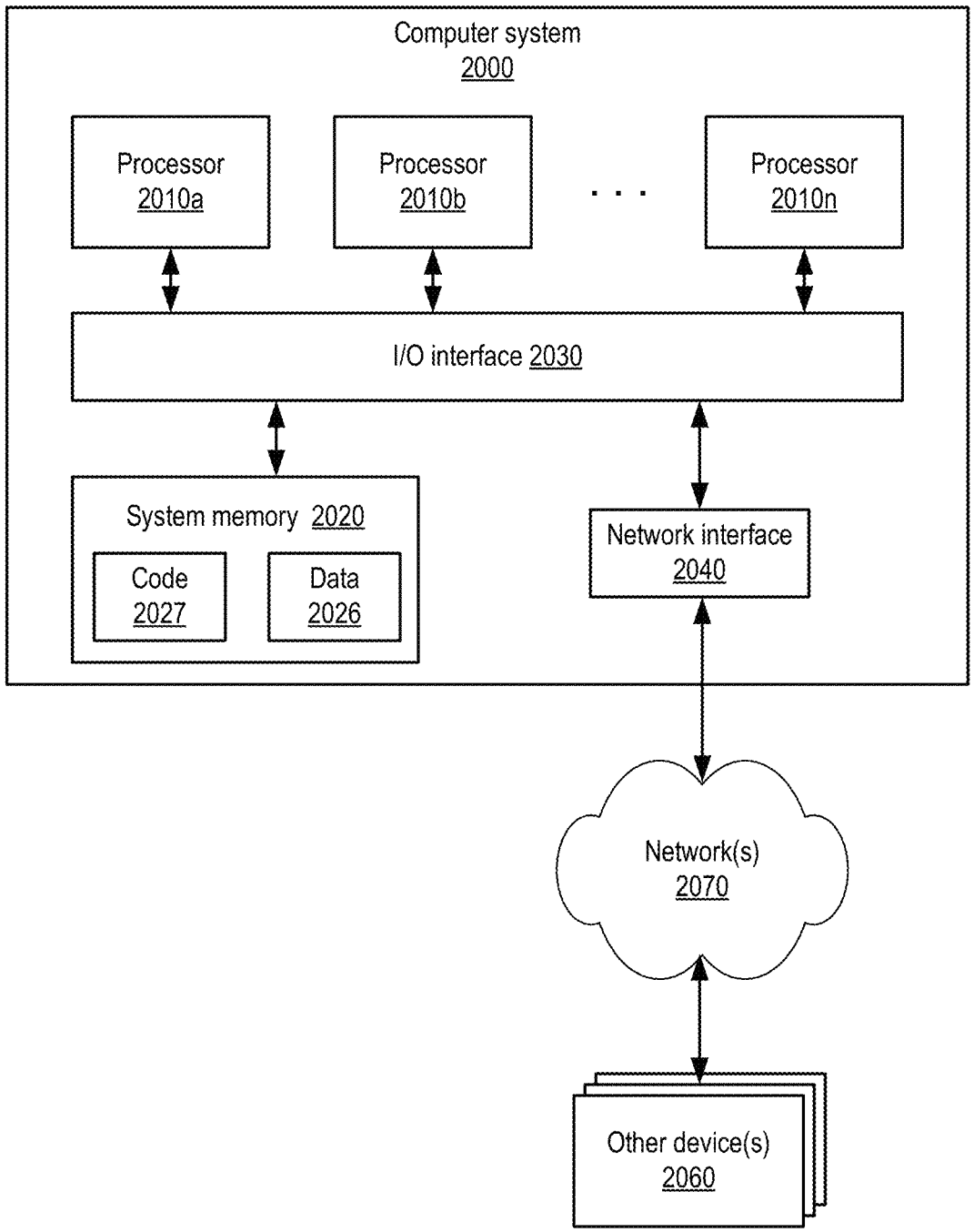
FIG. 21 is a block diagram illustrating an example computer system that may be used in some embodiments.

As shown in FIG. 1, a provider network may include an embodiment of a network visualization service 20 that may collect information on a client's provider network configuration from one or more sources and generate from the collected information graphical, dynamic, and interactive network diagrams 68 (e.g., non-limiting example network diagrams 68A and 68B) of the infrastructure (e.g., components, connections, and relationships) of the client's provider network configuration. The network visualization service 20 may be implemented on one or more computing devices within the provider network 10. FIG. 21 shows an example computer system on which network visualization service 20 or components thereof may be implemented. The network visualization service 20 may provide one or more application programming interfaces (APIs) via which processes external to provider network 10 (e.g., a process on client management console 66 or on access-enabled device 90) and/or processes internal to provider network 10 (e.g., a provider network management process 12 or another service on the provider network 10) may interface with the network visualization service 20.

A network diagram 68 may, for example, be a graphical representation of a client's virtual private network displayed by the network visualization service 20 to a physical console 66 at the client's external network 60 (example network diagram 68A), or alternatively displayed to other access-enabled devices coupled to provider network 10 via intermediate network 70 (e.g., example network diagram 68B displayed on access-enabled device 90 of FIG. 1). A network diagram 68 may include graphical representations of various virtualized resource components 16 of the client's virtual private network including but not limited to representations of compute instances, data storages (e.g., block-based storage volumes), databases, queues, virtual appliances, routers, load balancers, and various other virtual components of the client's virtual private network, as well as representations of relationships among and connections between and among the various components. In at least some embodiments, a network diagram 68 may also display representations of logical and/or geographical groupings of the virtual resources in the client's virtual private network, such as security groups, availability zones, and geographic regions. Embodiments of the network visualization service 20 and the network diagrams 68 provided thereby may make visualizing the client's provider network infrastructure and architectural organization much easier than conventional tabular/textual formats, for example allowing the client to more easily detect and correct architectural vulnerabilities.

In at least some embodiments, the network diagram 68 may be dynamic. That is, the network visualization service 20 may track events and changes to the client's provider network configuration, and update the network diagram 68 accordingly. In addition, in at least some embodiments, the network diagram 68 may be interactive. For example, the client may use the cursor or other user interface methods to select particular graphical objects displayed on the network diagram 68 and display additional information about a respective resource instance or connection. As another example, the client may use the cursor or other user interface methods to change the client's provider network configuration via the network diagram 68.

While not shown in FIG. 1, in at least some embodiments, the network visualization service 20 may also be accessed from within provider network 10 by provider network management personnel to view network diagrams 68 of clients' provider network configurations on provider network 10 management consoles.

Figure 2:
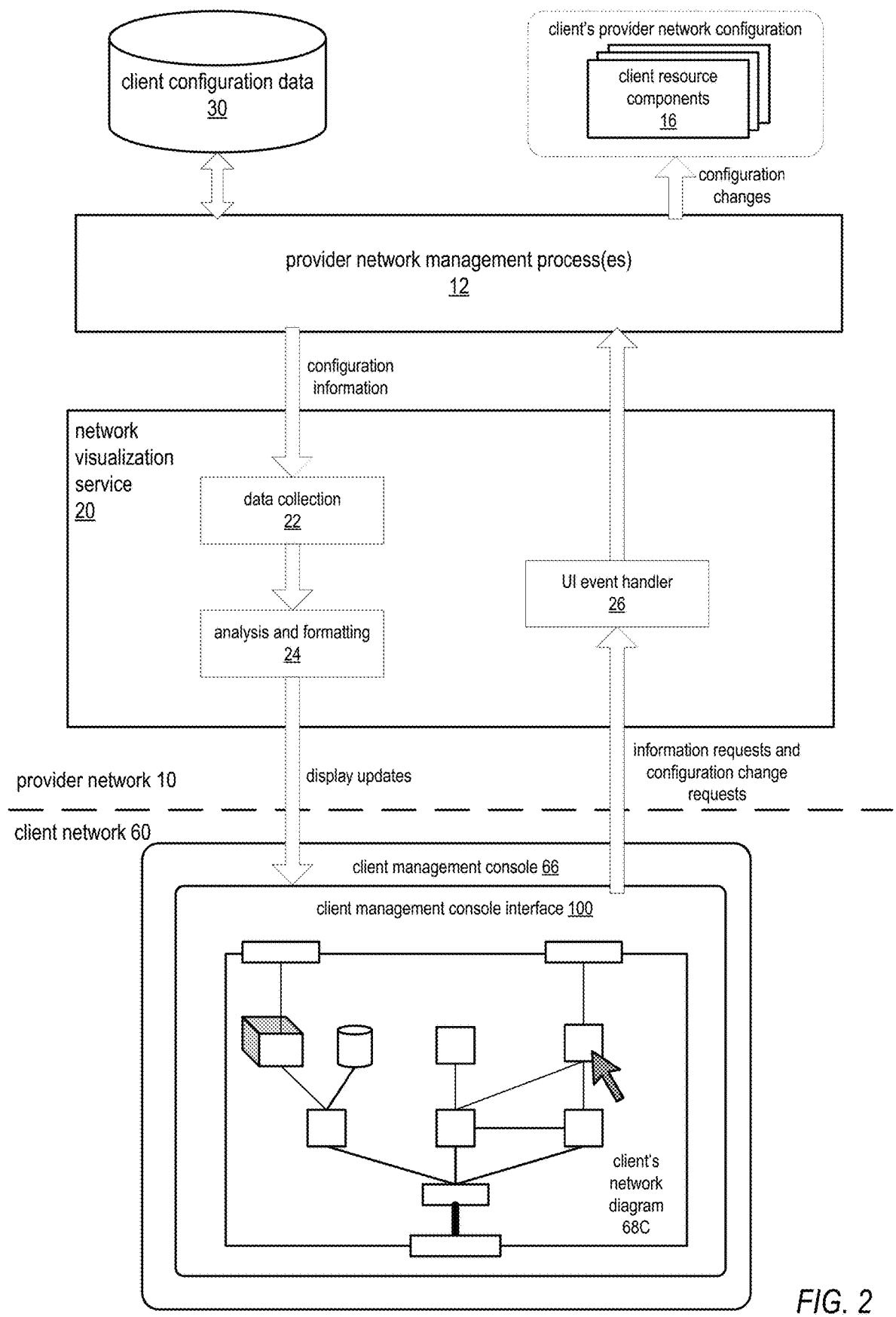
FIG. 2 illustrates high-level operations of and data flow for a network visualization service, according to at least some embodiments.

FIG. 2 illustrates high-level operations of and data flow for a network visualization service, according to at least some embodiments. Provider network 10 may include one or more provider network management process(es) 12 that may be accessed by clients to obtain (e.g., purchase, rent, or lease), configure, and manage resource components 16, including but not limited to computation and storage resource components, on the provider network 10. Provider network management process(es) 12 may store information about the clients' resource components 16 and provider network configurations as client configuration data 30, e.g. as alphanumeric data stored in tables, lists, records, databases, etc. While FIG. 2 shows client configuration data 30 as stored collectively, note that client configuration data may be stored by various processes 12 in different locations and/or in different formats.

A client, for example via client management console 66 on client network 60, may access network visualization service 20 via an API to the service 20 to request a network diagram 68C of the client's provider network configuration (e.g., a virtual private network configuration). In response, a data collection 22 component of network visualization service may access one or more provider network management processes 12 which may include but are not limited to services such as load balancer services, router services, storage virtualization services, and hardware virtualization services to obtain client configuration data 30 specific to the client. Each queried provider network management process 12 may gather data 30 specific to the client that the particular process 12 maintains from one or more locations and provide the requested data to the network visualization service. The client data thus collected by data collection 22 component may include, but is not limited to, information describing various virtual resource components including but not limited to virtual storage resources, compute resources, load balancers, routers, and network appliances, information describing connections among various virtual resources, routing information, geographic region and availability zone information, security group information, and in general any information pertinent to the client's resource components 16 and provider network configuration. The data collection 22 component may then pass the collected data 30 for the client to an analysis and formatting 24 component of network visualization service 20.

Analysis and formatting 24 component may analyze the collected data for the client and convert and format the data according to a graphical representation (e.g., example network diagram 68C) that graphically represents the client's virtual resources and their relationships (e.g., connections, groupings, locations, etc.) For example, different types of virtual resources as determined by the analysis of the data may be represented by different graphical icons or shapes (referred to as resource icons), connections among the client's resources may be represented by lines connecting various virtual resources, and locations or groupings may be represented by regular or irregular boundaries drawn around collections of resource icons. In at least some embodiments, information for drawing the graphical representation of the client's provider network configuration may be sent to the client management console 66 on client network 66. On the client management console 66, the information for drawing the graphical representation received from network visualization service 20 may be processed by a client management console interface 100 to render and display the client network diagram 68C. For example, client management console interface 100 may be a commercial web browser program, or alternatively client management console interface 100 may be a program provided by the service provider that operates the provider network 10. Note that, in at least some embodiments, textual information (e.g., names, types, identifiers, IP addresses, capacities, and so on) related to the virtual resources, connections, etc. may be included in the information transmitted to the interface 100 from the network visualization service and displayed on or adjacent to graphical objects representing the respective components, or groupings of components, of the client's provider network configuration.

In at least some embodiments, the information for drawing the graphical representation of the client's provider network configuration may be sent to the client management console 66 on client network 66 using Hypertext Transport Protocol (HTTP) technology. In at least some embodiments, HTTP Secure (HTTPS) technology may instead be used to transmit the information for security purposes. Note, however, that other technologies may be used to transmit the information to the client management console 66.

In at least some embodiments, as an alternative to sending information to the client management console interface 100 to be rendered and displayed as client network diagram 68C at the console 66, the network visualization service 20 may render the client network diagram as an image and then transmit the image to the console 66 for display to the interface 100.

In at least some embodiments, the network diagram 68C may be dynamic. Network visualization service 20 may track events and changes to the client's provider network configuration via provider network management process(es) 12, and update the network diagram 68C accordingly. For example, the client may access a provider network management process 12 via an interface to the process 12 to add, remove, or reconfigure a virtual resource provided via the respective process 12. Network visualization service 20 may detect the change to the client's provider network configuration via the provider network management process 12 and update the network diagram 68C accordingly.

In addition, in at least some embodiments, the network diagram 68 may be interactive. For example, the client may use the cursor or other user interface methods to select a particular graphical object representing a resource component displayed on the network diagram 68C to display additional information about a respective resource instance or connection, for example using a right click with the mouse to open a popup menu that includes a "view additional information" menu option or options. Selecting the menu option generates a UI event (or events) that is transmitted to a UI event handler 26 component of network visualization service, the event(s) specifying the particular virtual resource instance and the requested information. The UI event handler 26 may obtain the requested information for the virtual resource instance either from information already collected by data collection 22 component or by querying one or more provider network management processes 12 to request the information. The information may then be transmitted to the client management console interface 100 and displayed, for example textually in a dialog box or window. See FIGS. 7A through 7C for examples.

Examples of information for a resource component that may be thus displayed include but are not limited to routing table information for virtual routers, bandwidth, endpoint, and other information for virtual communications links, capacity and usage information for virtual storage resources, computation capabilities and usage information for compute resources such as virtual web servers and application servers, and load balancing statistics for load balancers. Other examples of information for a resource component that may be thus displayed include, but are not limited to, scheduled downtime or maintenance for the virtual resource instance, health information, status information, lists or ranges of IP addresses or endpoints of the respective virtual resource instance or lists of IP addresses or endpoints of other virtual resource instances to which the respective virtual resource instance is connected, and general description information provided by the client. In general, any statistical or configuration meta-information related to a particular resource type that is selected by the client may be displayed.

As another example of interactivity, in at least some embodiments, the client may use the cursor or other user interface methods supported by client management console interface 100 to change the client's provider network configuration via the network diagram 68C. For example, in at least some embodiments, the client may drag a virtual data volume icon onto a compute resource icon representing a virtual application server to mount the data volume on the server, or alternatively use the interface 100 to dismount a mounted volume from the server. As another example, in at least some embodiments, the client may add a connection between endpoints of two icons representing virtual resource instances to connect the two instances, or may disconnect a connection between two instances. As another example, the client may increase or decrease the allocated bandwidth of a connection via the interface 100. As another example, the client may drag an icon representing a virtual resource instance from one security group to another security group, or from one availability zone to another availability zone. As another example, the client may use the interface 100 to change the routing table for a virtual router, or the load balancing configuration of a virtual load balancer. As another example, the client may use the interface 100 to add, duplicate, or delete virtual resource instances of various types. Note that these are given as examples of operations that may be performed interactively by the client via the interface 100, and are not intended to be limiting. See FIGS. 8A and 8B for an example interactive operation that may be performed by the client via manipulation of the graphical icons displayed in the client network diagram 68C on interface 100.

In at least some embodiments, performing an interactive operation on the client network diagram 68C to change the client's provider network configuration using interface 100 generates a UI event (or events) that is transmitted to a UI event handler 26 component of network visualization service requesting the specified configuration change. The UI event handler 26 may then direct one or more provider network management processes 12 to make the requested change via API(s) to the respective process(es) 12. In some cases, a requested change may be made by a process upon receiving the request. However, in other cases, there may be a delay before the change can be made, or the change may not be doable. The process 12 may inform the network visualization service 20 of the status of the requested change, and the network visualization service 20 may then transmit status information and/or update information to the client management console interface 100 to be displayed on the interface 100. For example, if the change cannot be made, the network visualization service 20 may send a notification to the client via interface 100 informing the client that the change cannot be made, and may reset the client network diagram 68C to its previous state before the client requested the change using the interface 100. As another example, if there will be a delay before the change is made, the network visualization service 20 may send information to the interface 100 to indicate that the change is pending, and to provide a projected timeframe for when the change will be made. As another example, if the change has been made, the network visualization service 20 may send a notification to the client via interface 100 informing the client that the change has been made. Note that these examples are not intended to be limiting.

In at least some embodiments, the network visualization service 20 may monitor one or more of the provider network management process(es) to detect scheduled or unscheduled events that may effect particular virtual resource instances displayed in client network diagram 68C. For example, backup events, maintenance events, outages, hardware failures, failovers, and so on may be detected. Upon detecting such an event, the network visualization service 20 may indicate the event on the client network diagram 68C, for example by changing the color of a respective graphical icon or icons representing the effected virtual resource instances and/or by displaying textual information regarding the detected event at or near the icon or icons, such as projected start and end times for the event. Note that these examples are not intended to be limiting.

Example Client Network Diagrams

FIGS. 3 through 6 illustrate several examples of client private network diagrams that may be provided by an embodiment of the network visualization service 20 as illustrated in FIGS. 1 and 2. Note that these examples are not intended to be limiting. Different ones of the examples in FIGS. 3 through 6 are used to illustrate different aspects, configurations, and components of a client's virtualized private network that may be visualized using the private network diagrams generated by the network visualization service 20. However, it is to be noted that other types of virtualized components and other virtualized private network configurations than those shown in the examples are possible, and embodiments of the network visualization service 20 may also generate private network diagrams including these other types of components and indicating other configurations.

In the examples given in FIGS. 3 through 6, relatively simple 2D and 3D geometric shapes are used as "icons" that visually represent various virtualized components of the client's virtualized private network. However, these representations are not intended to be limiting. Other 2D and 3D shapes may be used, or more artistic 2D or 3D icons that visually represent corresponding virtualized components may be used instead of or in addition to the geometric shapes. Further note that the Figures show the icons in black and white; in practice, color and/or grayscale icons may be used instead of or in addition to black and white icons. In at least some embodiments, color, shading, or other visual characteristics may be used to indicate information about particular virtualized components or groupings of components. For example, green may be used to indicate currently active and healthy components, and red may be used to indicate inactive or down components or other problems with components.

In the examples given in FIGS. 3 through 6, straight lines connecting the icons represent connections between the corresponding virtualized components. However, these representations are not intended to be limiting. For example, curved lines may be used in addition to or instead of straight lines. In at least some embodiments, visual characteristics of the lines may be used to indicate information about respective connections. For example, thickness of the lines may be used to visually indicate bandwidth. As another example, color of the lines may be used to visually indicate status or health of the respective connections.

Figure 4:
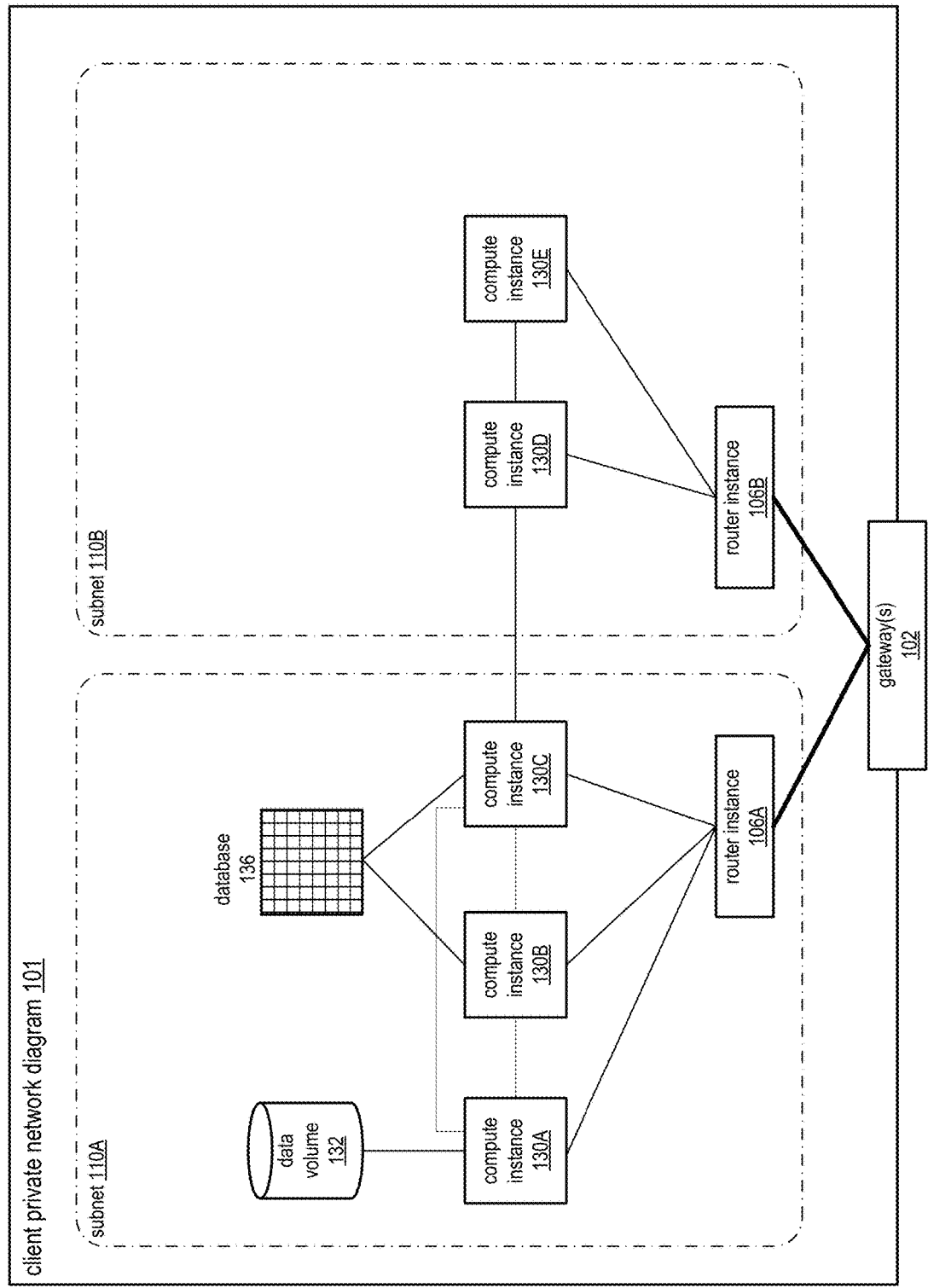
FIG. 4 illustrates an example client private network diagram including subnets, according to at least some embodiments.
Figure 5:
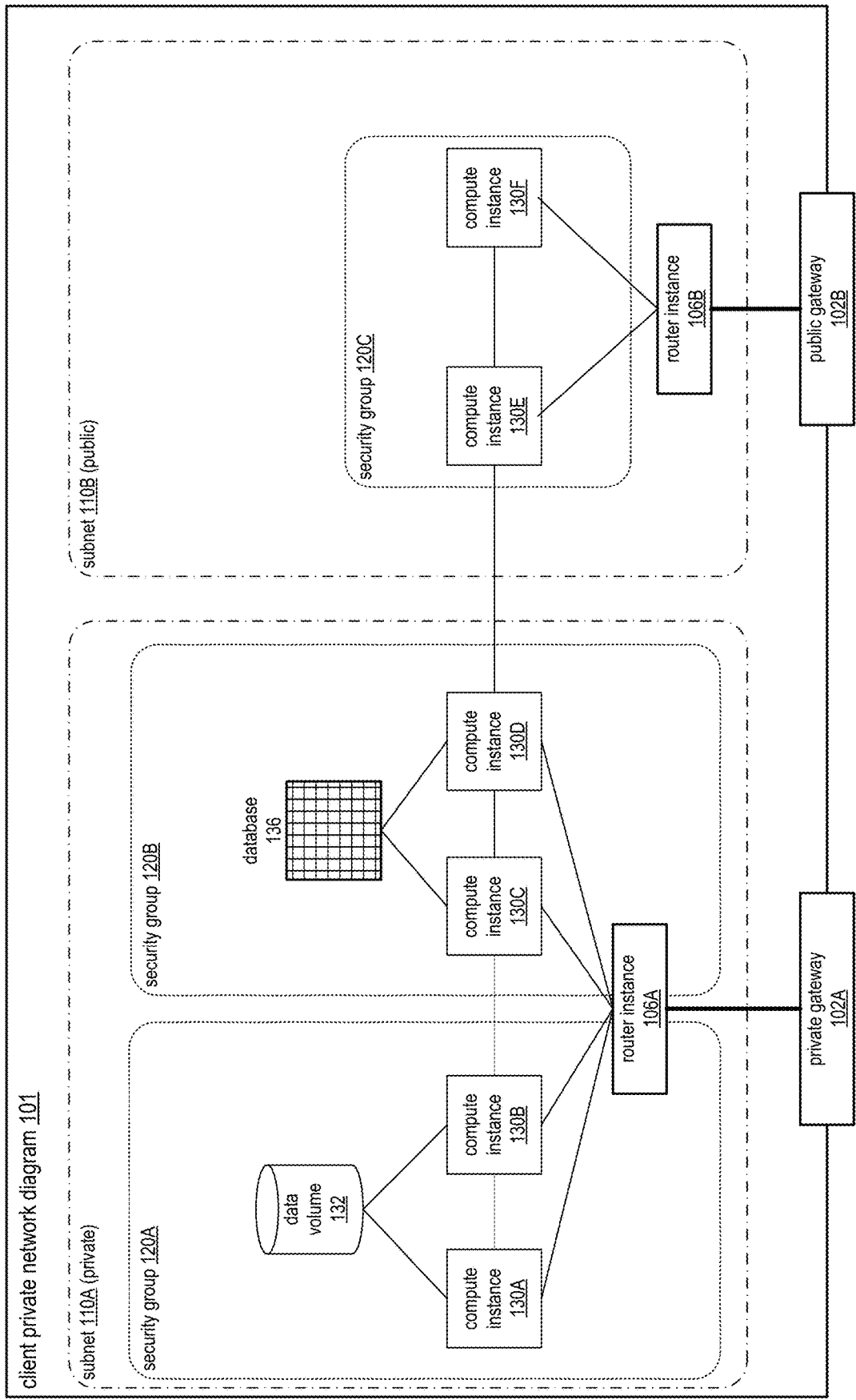
FIG. 5 illustrates an example client private network diagram including subnets and security groups, according to at least some embodiments.
Figure 6:
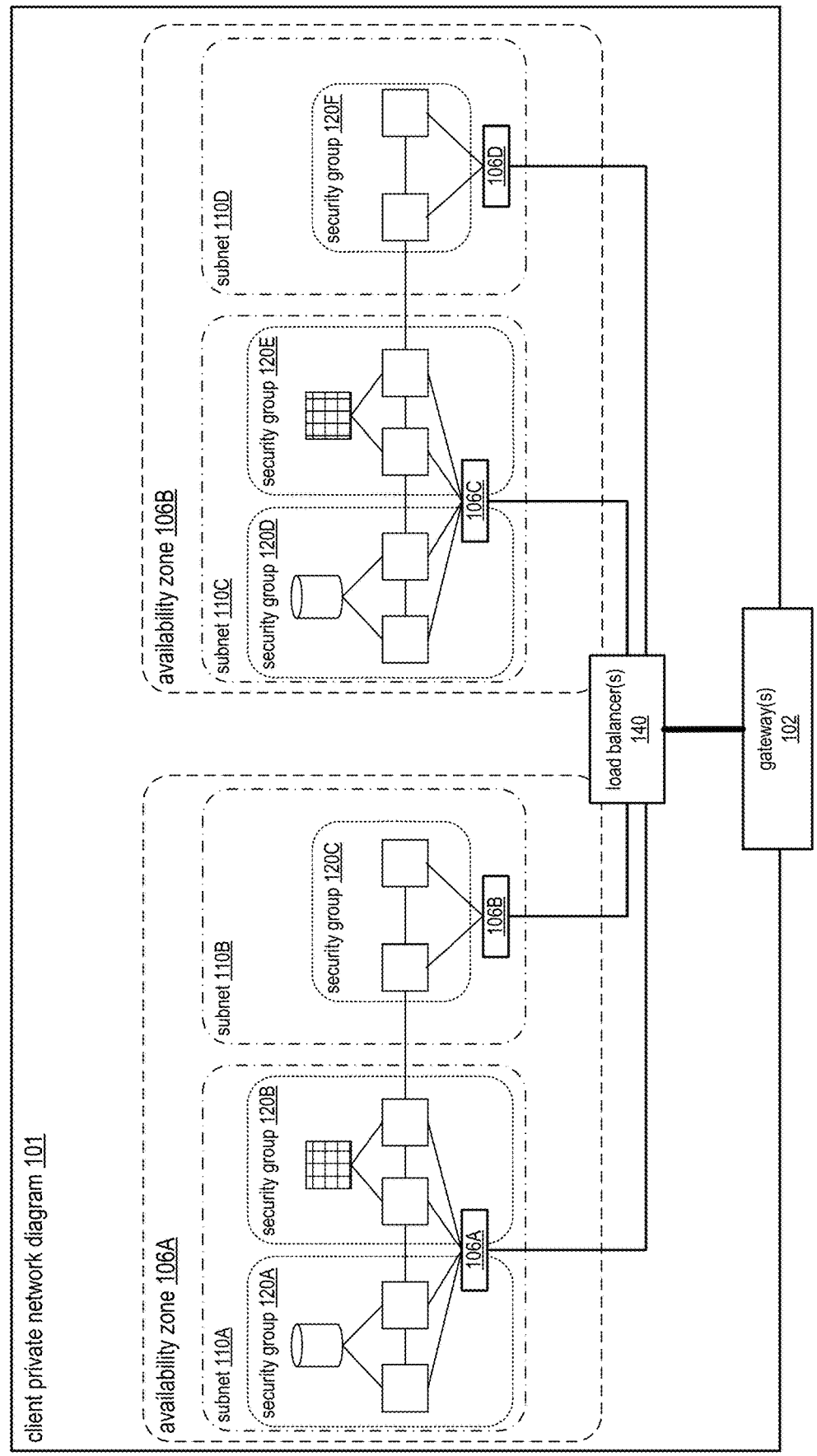
FIG. 6 illustrates an example client private network diagram in which the client's private network is distributed across availability zones, according to at least some embodiments.

In the examples given in FIGS. 4 through 6, rectangles with rounded corners and of different line types (dashes, dots, etc.) are used in the example private network diagrams to represent logical groupings (e.g., subnets, security groups) of virtualized resource instances within the client's virtualized private network, as well as distributions across geographic locations (e.g., availability zones). However, these representations are not intended to be limiting. Other shapes and line types, or other graphical methods, may be used in the private network diagrams to represent logical, physical and/or geographical groupings or arrangements of the client's virtualized resource instances in a virtualized private network configuration. For example, in some embodiments, the private network diagram may be overlaid on a geographic map to visualize geographical distribution of the private network across geographic regions and/or across availability zones within a geographic region. See FIGS. 18 through 20 for more information on geographic regions and availability zones, and FIG. 20 for an example of overlaying the private network diagram on a map.

Figure 3:
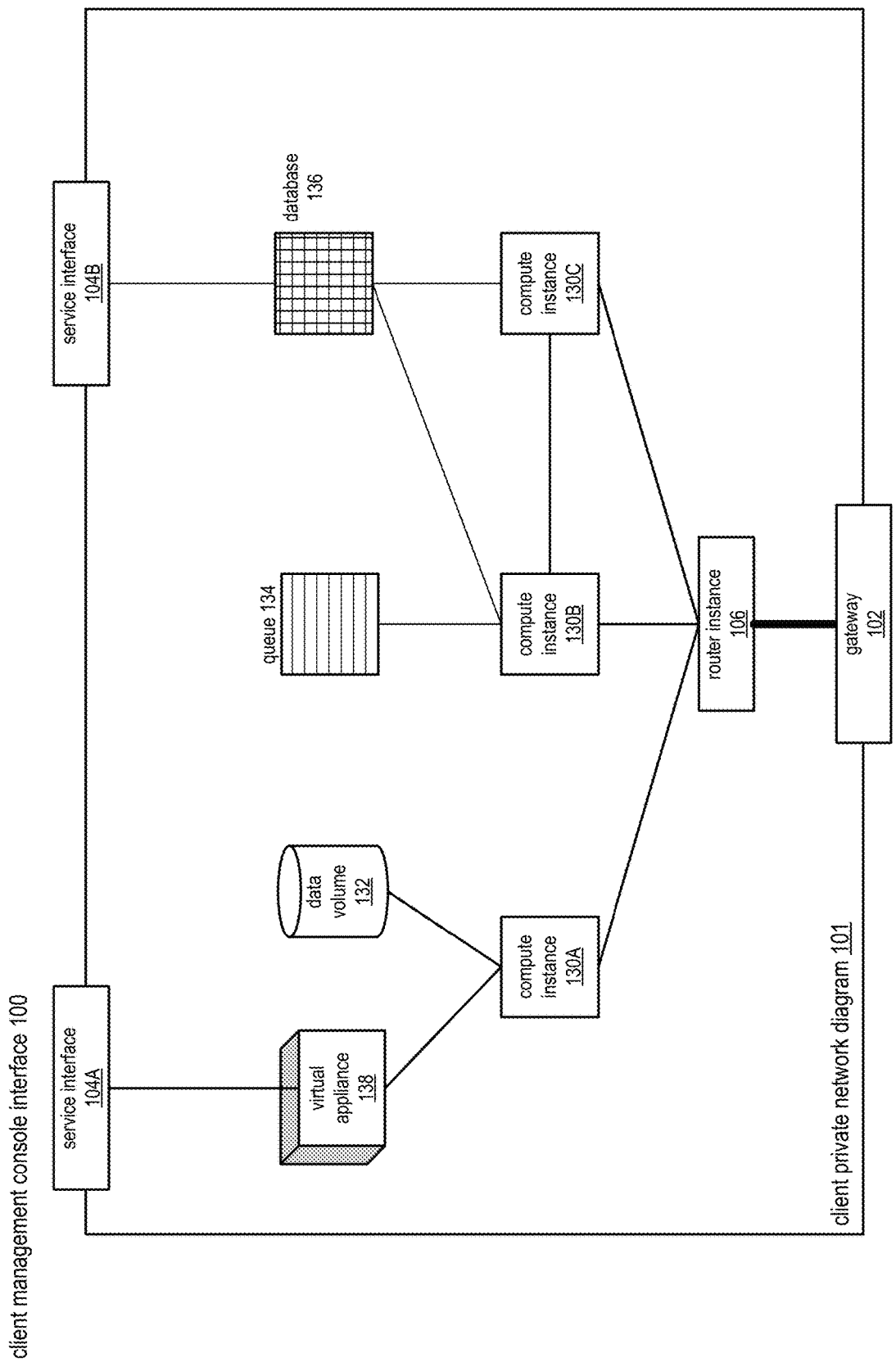
FIG. 3 illustrates an example client private network diagram, according to at least some embodiments.

FIG. 3 illustrates an example client private network diagram, according to at least some embodiments. A client private network diagram 101 may, for example, be displayed on a client management console interface 100. The client management console interface 100 may, for example, be displayed on a client management console 66 on a client network 60 as illustrated in FIG. 1, or on an access-enabled device 90 as illustrated in FIG. 1. The client private network diagram 101 may include one or more icons representing one or more gateways 102 to the virtualized private network. A gateway 102 may, for example, be a public gateway to a public subnet of the client's private network, or a private gateway to a private or secure subnet of the client's private network that is coupled to a gateway at the client's external network via a secure, private communications channel such as a virtual private network (VPN) connection (see, e.g., FIG. 16).

The client private network diagram 101 may also include one or more icons representing one or more router instances 106 on the virtualized private network, each router typically coupled to at least one gateway 102 as illustrated by the line between gateway 102 and router instance 106 in FIG. 3. Each router instance 106 may in turn be coupled to one or more virtual resource instances on the virtualized private network. In this example, router instance 106 is shown as being coupled to compute instances 130A, 130B, and 130C. Each compute instance may be a virtualized computing resource, for example implemented as a virtual machine (VM) on multi-tenant hardware that is shared with other clients and/or on hardware dedicated to the particular client. In at least some embodiments, the service provider may provide one or more services via which the client may obtain compute instances 130 (see, e.g., hardware virtualization service 1120 of FIG. 15). The client may configure a compute instance 130 to perform various functions. For example, a compute instance 130 may be configured as a web server or an application server, may be configured to perform some other server or computation function or functions, or may be configured to perform some other function such as routing, load balancing, or security functions.

The service provider, via the provider network, provides the virtualized computing resources (e.g., VMs) on which compute instances 130 are implemented; the client may configure the various compute instances 130 to perform whatever functions are necessary in the client's private network configuration, for example by adding appropriate software and data to the compute instances. Generally, the service provider and provider network management processes only track and are only aware of the virtualized computing resources allocated as compute instances 130 to the client, and are not necessarily aware of the application-specific configurations (e.g., installed software) of the virtualized computing resources that the client installs on the compute instances 130. Thus, in at least some embodiments, the client private network diagram 101 may only show the compute instances 130 as general icons representing compute nodes, and may not indicate the application-specific functionality of the compute instances 130 as configured by the client. However, in at least some embodiments, the provider network management processes via which the client obtains compute instances 130 may allow the user to provide names and/or descriptions for compute instances 130, and this information may be displayed to the client private network diagram 101 as textual labels and/or as meta-information that may be displayed by the client, e.g. by selecting a particular compute instance and requesting additional information (see, e.g., FIGS. 7A through 7C).

In addition to gateways 102, routers 106, and compute instances 130, a client may obtain various other types of virtualized resources for the client's private network via services provided by the service provider and/or by third parties. Icons representing instances of these other virtualized resources may also be displayed in the client private network diagram 101. FIG. 3 shows a few examples.

Figure 15:
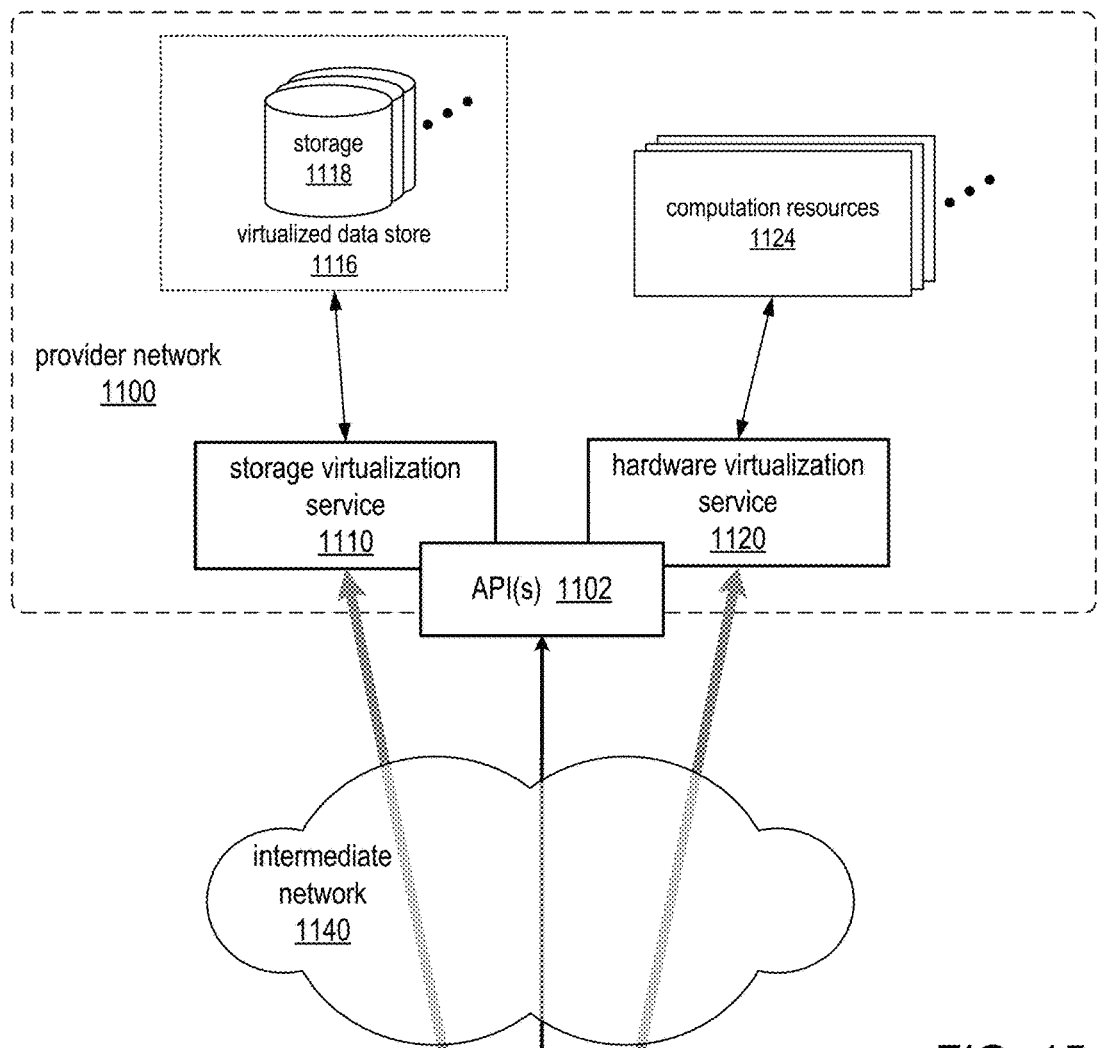
FIG. 15 is a block diagram of an example provider network that provides a storage virtualization service and a hardware virtualization service to clients, according to at least some embodiments.
Figure 15:
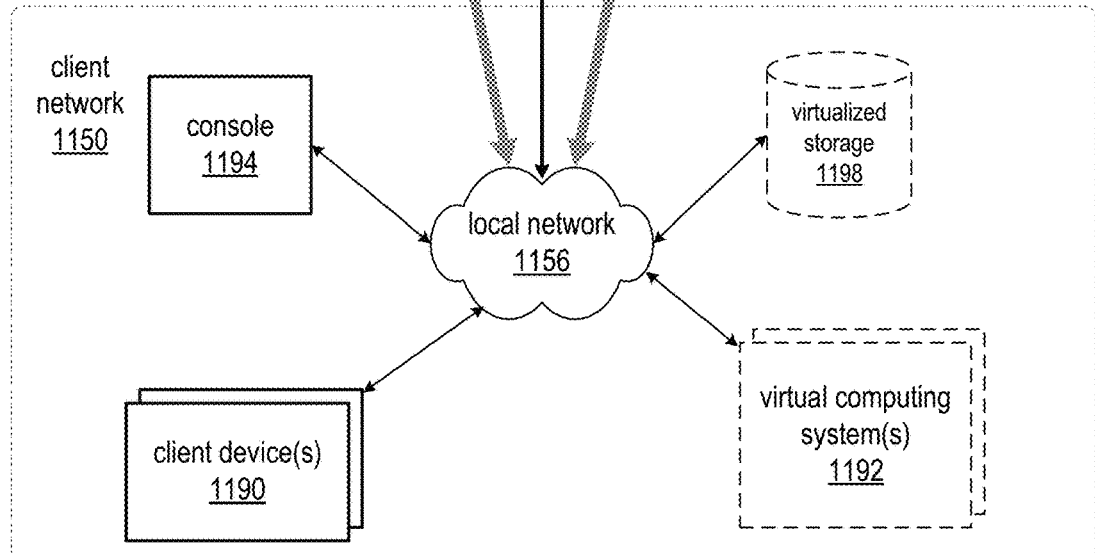

Data volume 132 represents a virtualized storage resource, for example a block-based storage volume provided by a block-based storage service (see, e.g., storage virtualization service 1110 of FIG. 15). Queue 134 represents a virtualized queue, for example a job queue, which may be provided by a queue service. Database 136 represents a virtualized database that may be provided by a database service. Virtual appliance 138 represents a virtualized network appliance that may be provided by a service of the service provider or by a third-party service. A virtual appliance 138 may, for example, serve as an in-network front-end to some functionality provided by the service provider or by a third-party external to the client's private network (e.g., functionality implemented in another subnet or private network on the provider network owned or operated by the service provider or third party).

While not shown, other types of virtualized resources may be represented as icons in the client private network diagram 101. Examples include, but are not limited to, network address translators (NATs), load balancers, security devices such as virtualized intrusion detection devices, and firewalls. As another example, the provider network may provide virtual network interface objects that may be attached to the virtualized resource instances (e.g., the compute instances 130) via a network interface virtualization service. Responsive to a record creation request, the service creates an interface record that may include an IP address, subnet information and security properties. The service may, in response to a request to attach the record to a resource instance, enable traffic directed to the IP address to flow to the resource instance. In response to a subsequent detach request, the traffic to the IP address may be disabled at the resource instance. The same interface record may be attached to another resource instance in response to another attach request, enabling traffic directed to the IP address to flow to the second resource instance. One or more icons representing these virtual network interface objects may be displayed attached to particular resource instances in the client private network diagram 101.

Service interfaces 104A and 104B represent example interfaces to service provider or third-party services or applications that are external to the client's private network. For example, service interface 104A may represent an interface to functionality (e.g., a service or application) implemented externally to the client's private network to which virtual appliance 138 serves as a front-end on the private network. Service interface 104B may represent an interface to a general storage service provided by the service provider on the provider network that provides backup storage for database 136. Note that these examples of service interfaces are not intended to be limiting.

The lines connecting compute instances 130 to each other and to other icons representing the other types of virtualized resources in client private network diagram 101 represent connections among the client's virtualized resource instances. For example, a connection is shown between compute instances 130B and 130C. As another example, the line between compute instance 130A and data volume 132 may indicate that volume 132 is mounted on or coupled to compute instance 130A. Note that the client may configure the connections between the various virtual resource instances in the private network in any way necessary or desired to obtain a desired configuration for the particular application being implemented on the private network. In at least some embodiments, the connections may be implemented according to overlay network technology on top of the network substrate of the provider network (see FIG. 14 for more information on overlay networks).

FIG. 4 illustrates an example client private network diagram including subnets, according to at least some embodiments. In at least some embodiments of a provider network, a client's virtualized private network may be, but is not necessarily, subdivided into two or more subnets. For example, in implementations that include both a private gateway and a public gateway, the private network may be subdivided into a subnet that includes resource instances reachable through the private gateway, and a subnet that includes resource instances reachable through the public gateway. In at least some embodiments, each subnet includes a router instance.

The example client private network diagram 101 of FIG. 4 shows the client's private network divided into two subnets 110A and 110B. One or more gateways 102 to the client's private network are shown connected to router instances 106. Each subnet 110 includes a router instance 106: router instance 106A in subnet 110A, and router instance 106B in subnet 110B. Subnet 110A includes compute instances 130A through 130C, each connected to each other compute instance 130 on subnet 110A. Compute instance 130A is shown as connected to data volume 132; compute instances 130B and 130C are shown as both connected to database 136. Subnet 110B includes compute instances 130D and 130E, and a connection is shown between compute instances 130D and 130E. In addition, compute instance 130D is shown as connected to compute instance 130C on subnet 110A.

FIG. 5 illustrates an example client private network diagram including subnets and security groups, according to at least some embodiments. In at least some embodiments, a provider network may allow the client to establish and manage virtual security groups within private networks, within or across subnets. A security group acts as a firewall that controls the traffic allowed to reach one or more resource instances within the security group. Each virtualized resource instance in the private network may be associated with one or more security groups.

The example client private network diagram 101 of FIG. 5 shows the client's private network divided into two subnets 110A and 110B. Subnet 110B is a public subnet accessed via public gateway 120B, and subnet 110A is a private subnet accessed via private gateway 120A. Each subnet 110 includes a router instance 106: router instance 106A in subnet 110A, and router instance 106B in subnet 110B. Subnet 110A includes security groups 120A and 120B. Subnet 110B includes security group 120C. The virtualized resource instances in subnet 110B (compute instances 130E and 130F) are all included in security group 120C. In subnet 110A, security group 120A includes compute instances 130A and 130B and data volume 132, while security group 120B includes compute instances 130C and 130D and database 136. Compute instance 130E in subnet 110B/security group 120C is connected to compute instance 130D in subnet 110A/security group 120B, and compute instance 130C in subnet 110A/security group 120B is connected to compute instance 130B in subnet 110A/security group 120A.

FIG. 6 illustrates an example client private network diagram in which the client's private network is distributed across availability zones, according to at least some embodiments. In at least some embodiments, a provider network may be implemented as one or more geographically dispersed regions (geographic areas, countries, etc.), with each region subdivided into one or more availability zones. An availability zone may be defined as a distinct location or zone engineered to be insulated from failures in other availability zones. Each availability zone may provide network connectivity to other availability zones in the same region. By establishing resource instances in separate availability zones, a client may protect their applications from failure at a single location.

The example client private network diagram 101 of FIG. 6 shows an example client private network distributed across two availability zones 106A and 106B. In this example, the client has established a client private network that includes two instances of a virtual network configuration similar to that shown in FIG. 5, with one instance of the virtual network configuration in each of availability zones 106A and 106B. Establishing instances of a virtual network configuration in separate availability zones as shown in FIG. 6 may, for example, protect the client's application(s) from failure (or scheduled downtime) in or of a single zone. In addition or alternatively, workload for an application may be distributed or balanced across two or more such instances. However, note that the client private network diagram 101 is given by way of example and is not intended to be limiting; a client's private network is not required to include duplicate instances of a virtual network configuration in different availability zones.

One or more gateways 102 to the client's private network are shown on the example client private network diagram 101 of FIG. 6. In this example, the gateway(s) 102 are shown as connected to one or more load balancer 140 instances that may act to distribute or load balance traffic to subnets 110 of the client's private network in each availability zone 106. Each subnet 110 includes a router instance 106: router instance 106A in zone 106A/subnet 110A, router instance 106B in zone 106A/subnet 110B, router instance 106C in zone 106B/subnet 110C, and router instance 106D in zone 106B/subnet 110D. Also shown are security groups 120 in each subnet 110, each security group 120 including one or more virtual resource instances: subnet 110A includes security groups 120A and 120B; subnet 110B includes security group 120C; subnet 110C includes security groups 120D and 120E; and subnet 110D includes security group 120F.

While not shown, in at least some embodiments, a security group 120 may extend across two or more subnets 110. In addition, while not shown, a virtual resource instance in one availability zone 106 may be connected to a virtual resource instance in another zone 106, and the connection may be shown on the client private network diagram 101.

Example Client Interactions with the Client Private Network Display

FIGS. 7A through 7C and FIGS. 8A and 8B illustrate example client interactions with a client private network diagram. In at least some embodiments, a client private network diagram may be interactive. That is, the diagram may provide an interactive user interface that allows the client to display additional information about components of the client's private network and/or to modify the actual client private network implementation by modifying the diagram. For example, the graphical objects on the diagram representing virtual resource instances, connections, and/or groupings may be selected using the cursor or other user interface methods to obtain additional information for the respective virtual resource instances. As another example, the graphical objects on the diagram representing virtual resource instances, connections, and/or groupings may be manipulated using the cursor or other user interface methods to generate requests for modifications to the configuration of the client's private network. Note that the example interactions illustrated in FIGS. 7A through 7C and FIGS. 8A and 8B are given by way of example, and are not intended to be limiting.

Figure 7A:
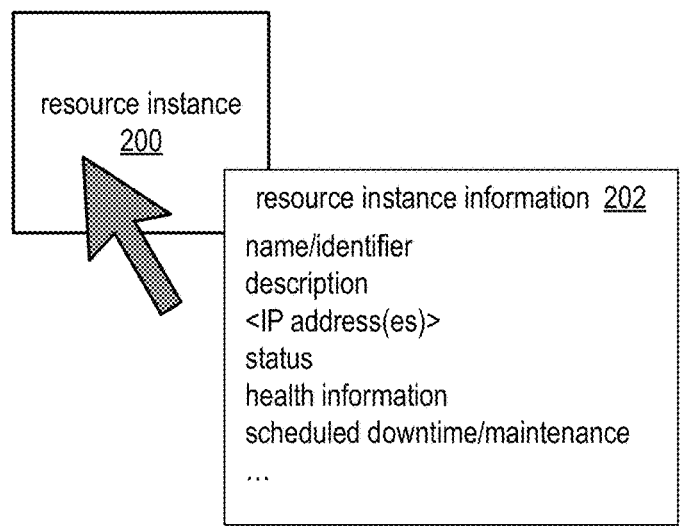
FIGS. 7A through 7C and FIGS. 8A and 8B illustrate example client interactions with a client private network diagram to obtain additional information for and to modify the configuration of the client's private network, according to at least some embodiments.

FIG. 7A illustrates selecting an icon representing a resource instance on the client private network diagram to display additional information about the respective resource instance, according to at least some embodiments. For example, the user may move the cursor (represented by an arrow in FIGS. 7A through 8B) over a resource instance 200 to display information 202 about the selected resource instance 200. As another example, the user may move the cursor over the resource instance 200 and right-click to display information 202 about the selected resource instance 200. In this example, resource instance information 202 is shown to include at least a name and/or identifier of resource instance 200, a description of resource instance 200, one or more IP addresses (or a range of IP addresses) associated with resource instance 200, status and/or health information for resource instance 200, and scheduled downtime/maintenance information for resource instance 200. Note that this information 202 is given by way of example and is not intended to be limiting; other information relevant to resource instance 200 may be displayed, and the information items shown in resource instance information 202 are not necessarily displayed. For example, if resource instance 200 is a virtual router instance, information 202 may include routing table information.

Figure 7B:
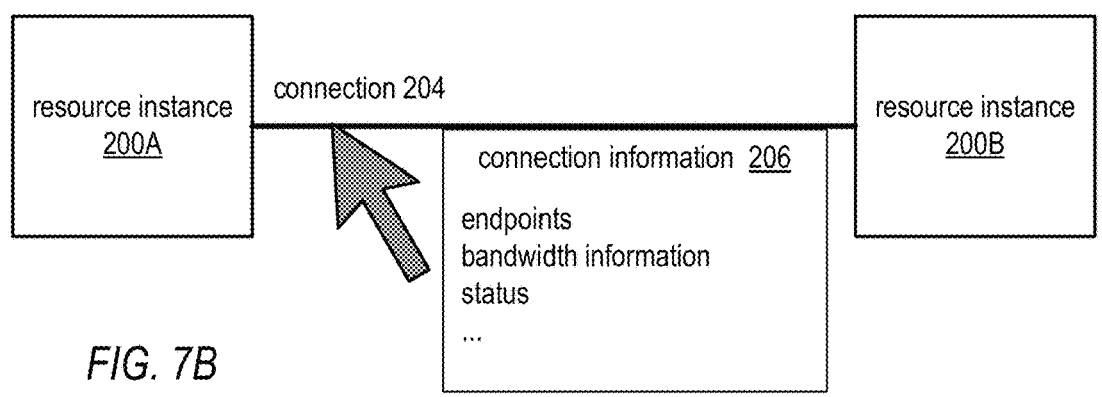

FIG. 7B illustrates selecting a line representing a connection between resource instances on the client private network diagram to display additional information about the respective connection, according to at least some embodiments. For example, the user may move the cursor over a line representing a connection 204 between two resource instances 200A and 200B to display information 206 about the selected connection 204. As another example, the user may move the cursor over the connection 204 and right-click to display information 206 about the selected connection 204. In this example, connection information 206 is shown to include at least information describing endpoints to which the connection 204 is coupled, bandwidth information for the connection 204, and status information for the connection. Note that this information 206 is given by way of example and is not intended to be limiting; other information relevant to connection 204 may be displayed, and the information items shown in connection information 206 are not necessarily displayed.

Note that, in at least some embodiments, a similar user interface technique to that shown in FIGS. 7A and 7B may be used to select other graphical objects on the client private network diagram to display additional information relevant to particular aspects of the client's private network associated with the graphical objects, for example subnets or security groups.

Figure 7C:
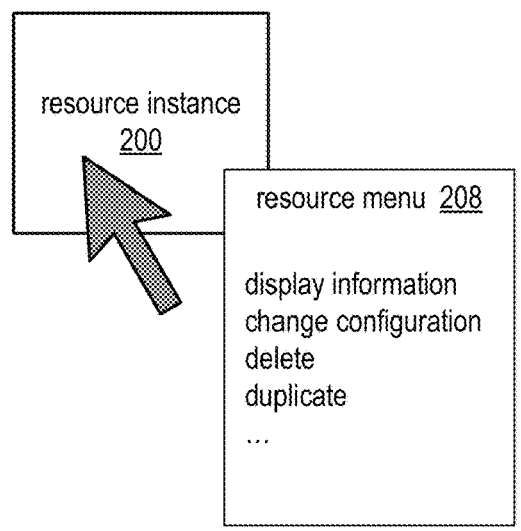

FIG. 7C illustrates selecting an icon representing a resource instance on the client private network diagram to display a popup menu of options relevant to the particular resource instance or type of resource instance, according to at least some embodiments. For example, the user may move the cursor over the resource instance 200 and right-click to display resource menu 208 that includes several menu options for resource instance 200. In the example menu 208, the menu options are shown to at least include a "display information" menu option which the user may select to display additional information about the respective resource instance 200, a "change configuration" menu option which the user may select to change one or more aspects of the configuration of the respective resource instance 200 on the client's private network, a "delete" menu option which the user may select to delete the respective resource instance 200 from the client's private network, and a "duplicate" menu option which the user may choose to make a copy or duplicate of the respective resource instance 200 on the client's private network. Note that the menu options shown in example menu 208 are given by way of example and are not intended to be limiting; other menu options for resource instance 200 may be provided, and the menu options shown in menu 208 are not necessarily provided. For example, if resource instance 200 is a virtual router instance, menu 208 may include a menu option to change the routing table of the respective router instance.

Note that a similar user interface technique to that shown in FIG. 7C may be used with other graphical objects on the client private network diagram to display popup menus with options relevant to particular aspects or components of the client's private network associated with the graphical objects, for example connections, subnets or security groups.

Selecting a graphical object or a menu option via the user interface provided via the client private network diagram as illustrated in FIGS. 7A through 7C may generate a UI event (or events) that is transmitted to the network visualization service, the event(s) specifying the respective component of the client's private network and the requested information or action.

If the UI event is requesting additional information about the respective component, the network visualization service may obtain the requested information for the component either from information already collected by the network visualization service or by querying one or more provider network management processes to request the information. The information may then be transmitted to the device on which the client private network diagram is active and displayed, for example textually in a dialog box or window on the client private network diagram as shown in FIGS. 7A and 7B.

If the UI event is requesting a change to the client's provider network configuration, the network visualization service may direct one or more provider network management processes to make the requested change via API(s) to the respective process(es). The process(es) may inform the network visualization service of the status of the requested change, and the network visualization service may then transmit status information and/or update information to the device on which the client private network diagram is active to be displayed on the interface. For example, if the change cannot be made, the network visualization service may send a notification to the client via the interface informing the client that the change cannot be made, and may reset the client private network diagram to its previous state before the client requested the change using the interface. As another example, if there will be a delay before the change is made, the network visualization service may send information to the interface to indicate that the change is pending, and to provide a projected timeframe for when the change will be made. As another example, if the change has been made, the network visualization service may send a notification to the client via the interface informing the client that the change has been made. Note that these examples are not intended to be limiting.

Figure 8A:
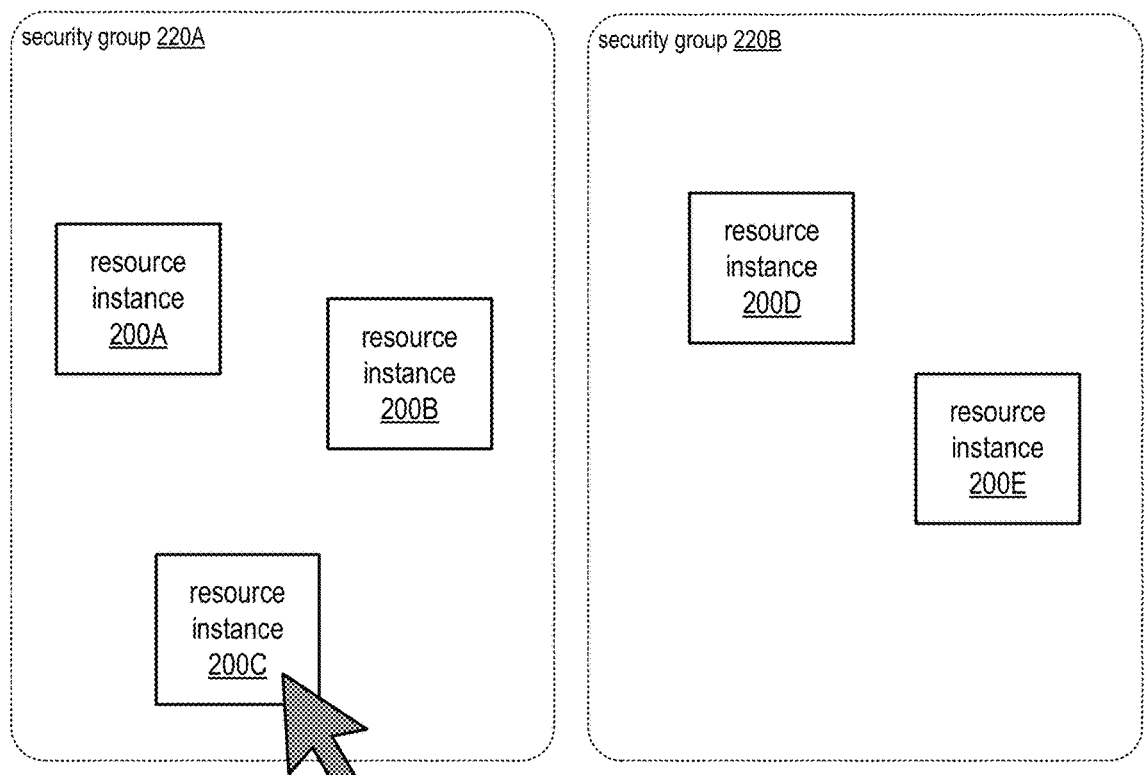
Figure 8B:
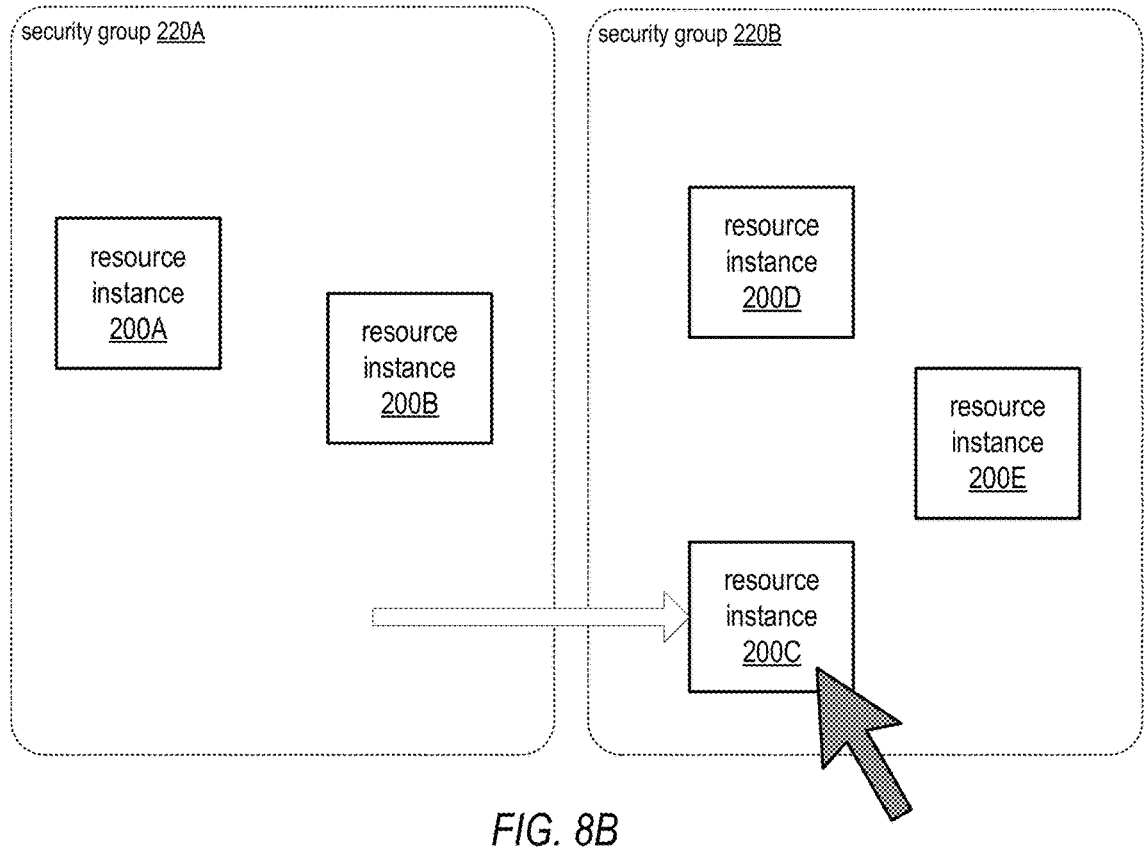

FIGS. 8A and 8B show an example interactive operation that the client may perform via the client private network diagram to modify the client private network configuration on the provider network. FIG. 8A shows two security groups 220A and 220B in an example client private network diagram. Security group 220A currently includes resource instances 200A through 200C, and security group 220B currently includes resource instances 200D and 200E. By viewing the client private network diagram displayed on a console at the client's network, the client may easily detect that a resource instance (in this case, resource instance 200C) is in the wrong security group 220. As shown in FIG. 8B, the client may drag-and-drop the icon representing resource instance 200C from security group 220A onto security group 220B. The drag-and-drop action generates a UI event (or events) that is transmitted to the network visualization service requesting the specified configuration change. The network visualization service may then direct an appropriate one or more provider network management processes to make the requested change via API(s) to the respective process(es). Notifications of the status of the requested change may be provided to the client, for example as described above in relation to FIGS. 7A through 7C.

The interactive operation shown in FIGS. 8A and 8B is given by way of example. Similar or other UI methods may be used to request other configuration changes to the client's virtual private network via the client private network diagram. For example, in at least some embodiments, the client may drag a virtual data volume icon onto a compute resource icon representing a virtual application server to mount the data volume on the server, or alternatively use the interface to dismount a mounted volume from the server. As another example, in at least some embodiments, the client may add a connection between endpoints of two icons representing virtual resource instances to connect the two instances, or may disconnect a connection between two instances. As another example, the client may increase or decrease the allocated bandwidth of a connection via the interface. As another example, the client may drag an icon representing a virtual resource instance from one availability zone to another availability zone. As another example, the client may use the interface to change the routing table for a virtual router, or the load balancing configuration of a virtual load balancer. As another example, the client may use the interface to add, duplicate, or delete virtual resource instances of various types. Note that these are given as examples of operations that may be performed interactively by the client via the client private network diagram, and are not intended to be limiting.

Network Visualization Service Operations

FIGS. 9 through 12 are high-level flowcharts of operations of a network visualization service, and are not intended to be limiting.

Figure 9:
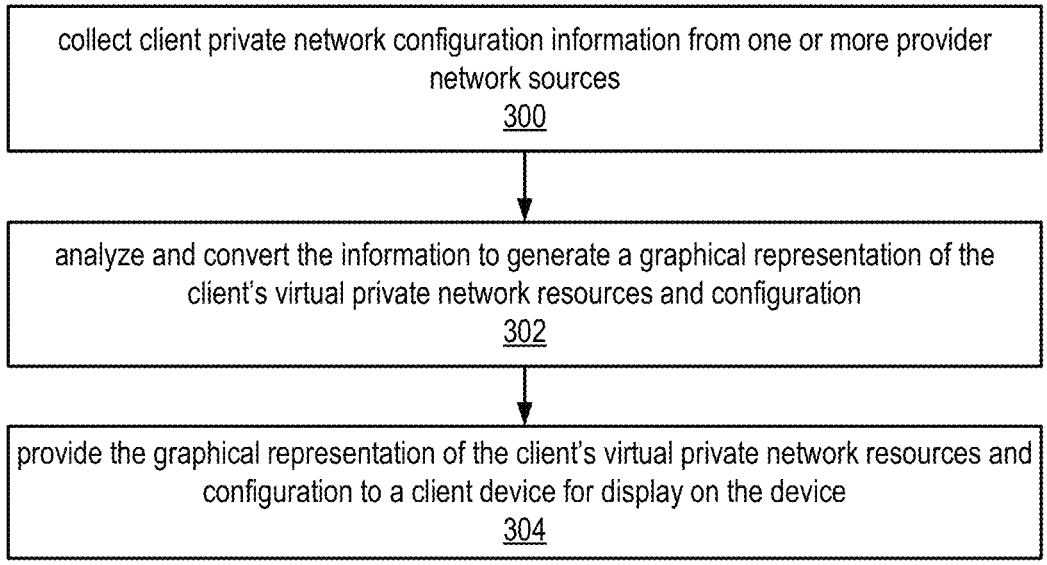
FIG. 9 is a high-level flowchart of operations of a network visualization service in generating a client private network diagram, according to at least some embodiments.

FIG. 9 is a high-level flowchart of operations of a network visualization service in generating a client private network display, according to at least some embodiments. A client, via a device on the client's network or via some other access-enabled device, may access the network visualization service via an API to request a network diagram of the client's virtual private network configuration on the provider network. In response to the request, as indicated at 300, the network visualization service may collect client private network configuration information from one or more provider network sources. For example, the sources may include one or more provider network management processes as shown in FIGS. 1 and 2. Examples of provider network management processes may include but are not limited to services such as load balancer services, router services, storage virtualization services, and hardware virtualization services. Each queried source may gather data specific to the client that the particular process maintains and provide the requested data to the network visualization service.

As indicated at 302, the network visualization service may analyze the collected information collected from the sources to determine the client's private network configuration (e.g., connections, groupings, etc.), and convert the analyzed information to a graphical representation of the client's virtual private network resources and configuration.

As indicated at 304, the network visualization service may then provide the graphical representation of the client's virtual private network resources and configuration to a client device for display, for example to a device on the client's network or some other access-enabled device. In at least some embodiments, information for drawing the graphical representation of the client's provider network configuration may be sent by the network visualization service to the device from which the request was received. On the client's device, the information for drawing the graphical representation received from the network visualization service may be processed and displayed as a client private network diagram. Alternatively, the client private network diagram may be rendered by the network visualization service and sent to the client's device as an image for display.

Figure 10:
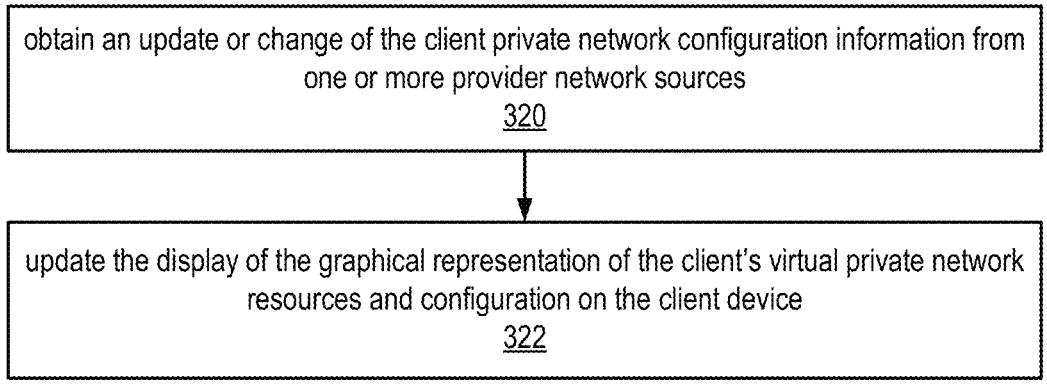
FIG. 10 is a high-level flowchart of operations of a network visualization service in updating a client private network diagram, according to at least some embodiments.

FIG. 10 is a high-level flowchart of operations of a network visualization service in updating a client private network display, according to at least some embodiments. As indicated at 320, the network visualization service may obtain an update or change of the client private network configuration information from one or more provider network sources. The network visualization service may track events and changes to the client's private network configuration via one or more provider network management process(es). The client may, for example, access a provider network management process via an interface to the process to add, remove, or reconfigure a virtual resource provided via the respective process. Alternatively, a provider network management process or a provider network agent may cause a change in a client's private network configuration. The network visualization service may detect a change to the client's provider network configuration via the provider network management process(es). As indicated at 322, in response to detecting a change to the client's provider network configuration, the network visualization service may update the display of the graphical representation of the client's virtual private network resources and configuration on the client device to reflect the change.

Figure 11:
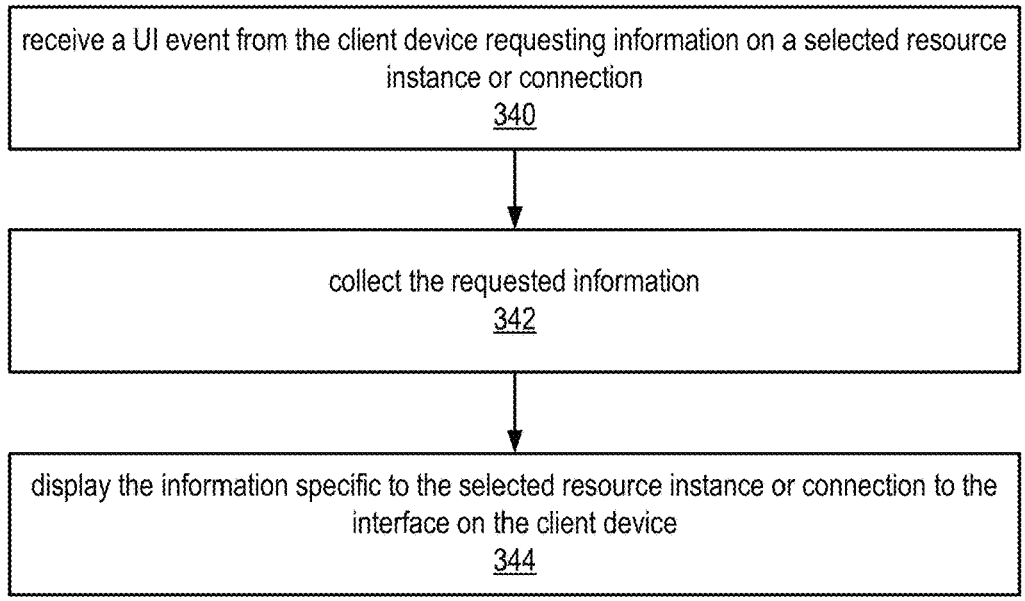
FIG. 11 a high-level flowchart of operations of a network visualization service to process requests for additional information, according to at least some embodiments.

FIG. 11 a high-level flowchart of operations of a network visualization service to process requests for additional information, according to at least some embodiments. As indicated at 340, the network visualization service may receive a UI event from a client device on which a client private network diagram is displayed. The event may, for example, request information on a selected resource instance or connection. As indicated at 342, the network visualization service may obtain the requested information either from information already collected by the network visualization service or by querying one or more provider network management processes to request the information. As indicated at 344, the network visualization service may display the information specific to the selected resource instance or connection to the interface on the client device.

Figure 12:
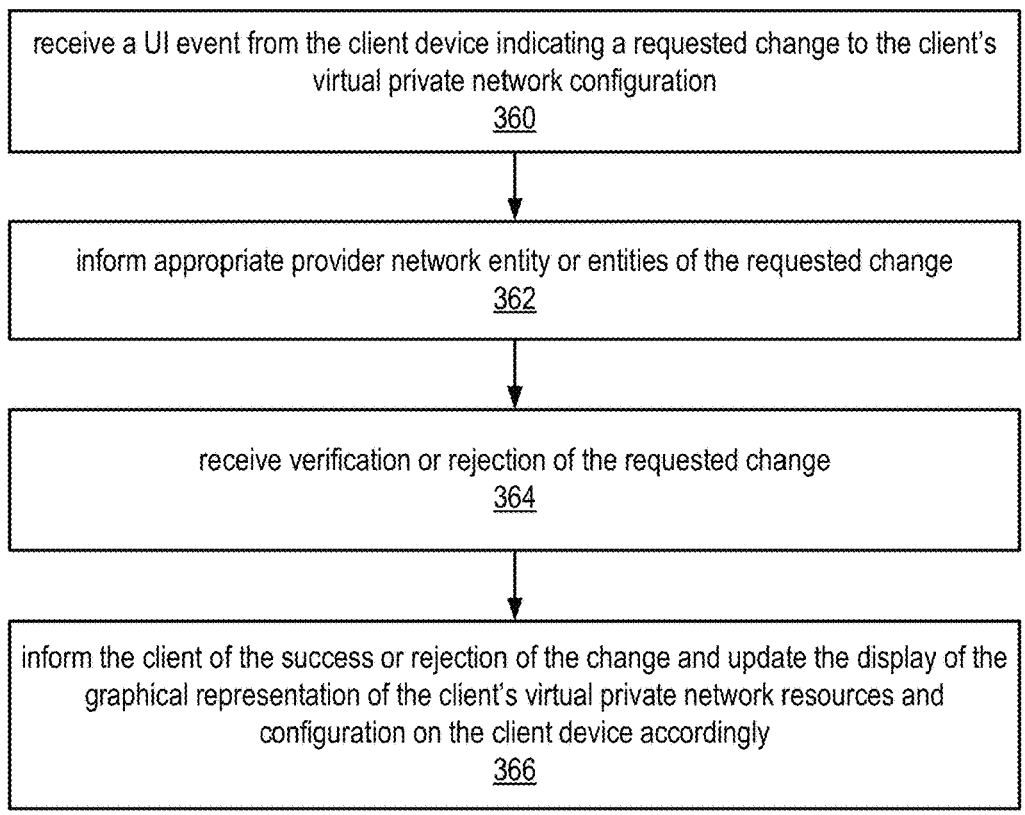
FIG. 12 a high-level flowchart of operations of a network visualization service to process requests for configuration changes, according to at least some embodiments.

FIG. 12 a high-level flowchart of operations of a network visualization service to process requests for configuration changes, according to at least some embodiments. As indicated at 360, the network visualization service may receive a UI event from a client device on which a client private network diagram is displayed. The request may indicate a requested change to the client's virtual private network configuration. As indicated at 362, the network visualization service may inform an appropriate provider network entity or entities (e.g., a service or other provider network management process) of the requested change. As indicated at 364, the network visualization service may receive an indication of verification or rejection of the requested change. As indicated at 366, the network visualization service may then inform the client of the success or rejection of the requested change, and if necessary may update the client private network diagram displayed on the client device accordingly.

Example Provider Network Environments

This section describes example provider network environments in which the above-described embodiments of the network visualization service and the network diagrams provided thereby may be implemented. However, these example provider network environments are not intended to be limiting.

FIG. 13 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

FIG. 14 illustrates an example data center that implements an overlay network on a network substrate using IP tunneling technology, according to some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 14) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology; the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 14, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 14, at least some networks in which embodiments may be implemented may include hardware virtualization technology that enables multiple operating systems to run concurrently on a host computer (e.g., hosts 1020A and 1020B of FIG. 14), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024.

The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 14 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs) 1024 via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

FIG. 15 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 15, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 16 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other peering connection over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnets 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 16 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 16 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

Figure 17:
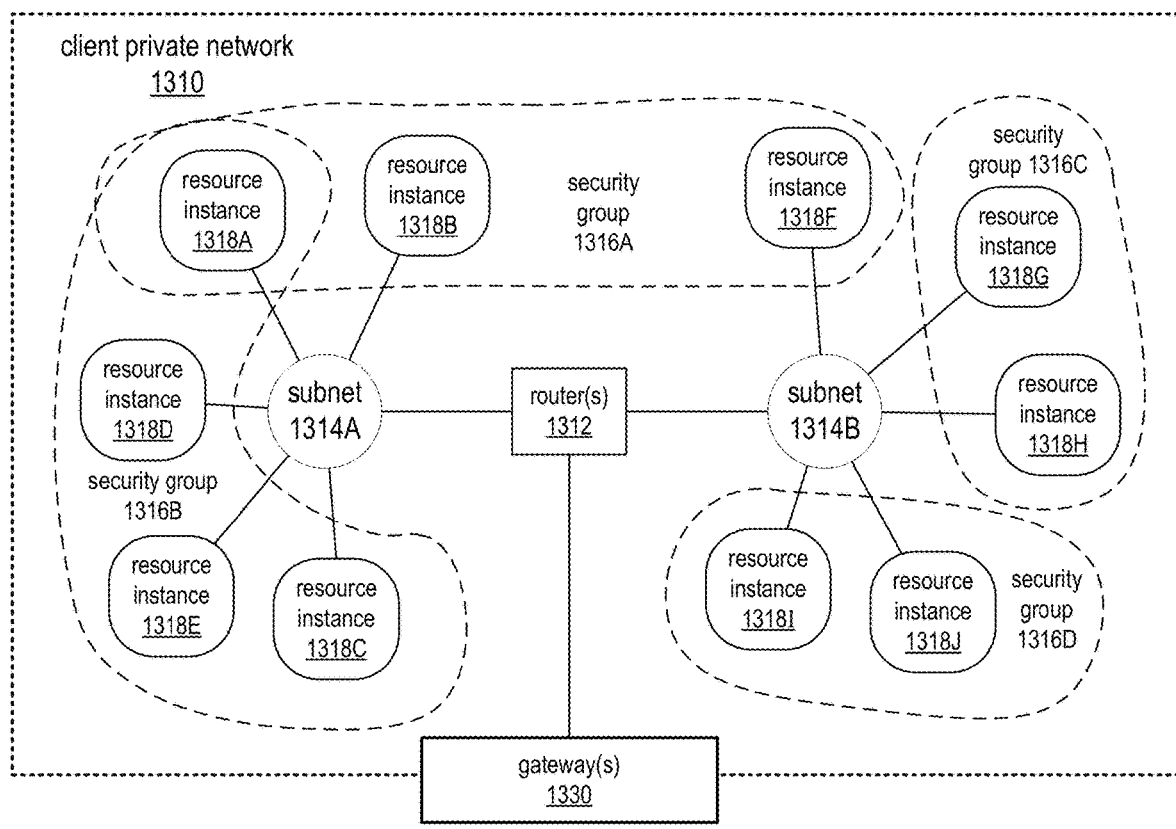
FIG. 17 illustrates subnets and security groups in an example virtual private network implementation on a provider network, according to at least some embodiments.

FIG. 17 illustrates subnets and security groups in an example virtual private network implementation on a provider network, according to at least some embodiments. In at least some embodiments, a provider network such as provider network 1200 in FIG. 16 may allow the client to establish and manage virtual security groups 1316 within the client's virtual private network 1310, within or across subnets 1314. A security group 1316 acts as a firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 17, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In the example shown in FIG. 17, resource instances 1318A through 1318E are on subnet 1314A, and resource instances 1318F through 1318J are on subnet 1314B. The client has established four security groups 1316A through 1316D. As shown in FIG. 17, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Figure 18:
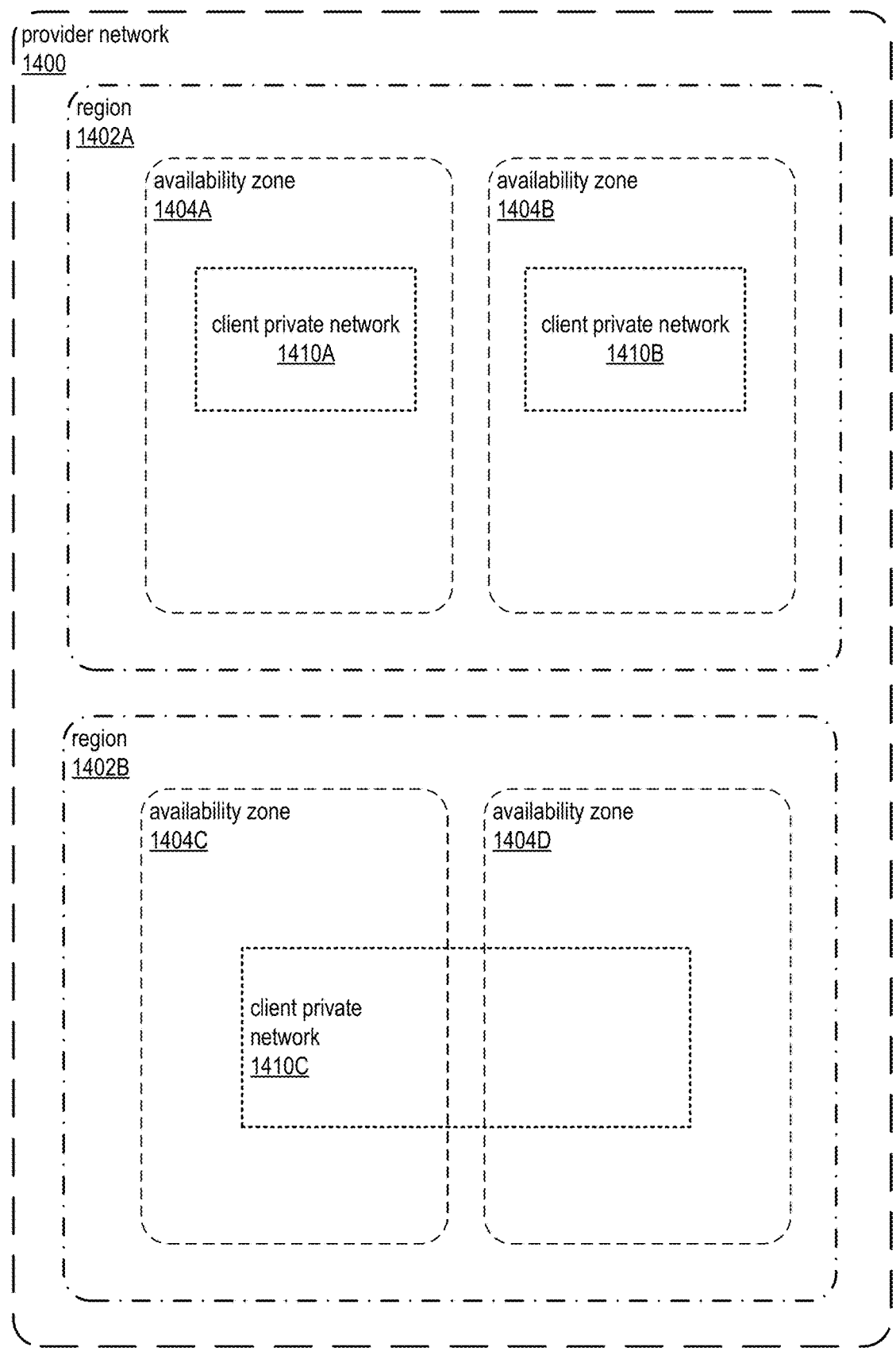
FIG. 18 illustrates regions and availability zones in a provider network, according to at least some embodiments.

FIG. 18 illustrates regions and availability zones in a provider network, according to at least some embodiments. In at least some embodiments, a provider network such as provider network 1200 in FIG. 16 may be divided into different geographic locations, and may allow clients to allocate resource instances in and/or to implement virtual private networks across multiple locations. For example, a provider network 1400 may be implemented as one or more geographically dispersed regions 1402 (geographic areas, countries, etc.), with each region 1402 subdivided into one or more availability zones 1404. An availability zone 1404 may be defined as a distinct zone engineered to be insulated from failures in other availability zones 1404. Each availability zone 1404 may provide network connectivity to other availability zones 1404 in the same region 1402. By establishing resource instances and/or network configurations in separate availability zones 1404, a client may, for example, protect their applications from failure at a single location.

The example in FIG. 18 shows an example provider network 1400 that is divided into two regions 1402A and 1402B. Each region 1402 is further divided into two availability zones 1404; region 1402A includes availability zones 1404A and 1404B, and region 1402B includes availability zones 1404C and 1404D. Availability zones 1404A and 1404B of region 1402A are each shown as including a client private network (1410A and 1410B, respectively). Client private networks 1410A and 1410B may be associated with the same client, or with different clients. Client private network 1410C is shown as extending across availability zones 1404C and 1404D in region 1402B. Note that a client may have one or more private networks 1410 established in each of two or more different regions 1402, and may have one or more private networks 1410 established in or across two or more different availability zones 1404 within a given region 1402.

Figure 19:
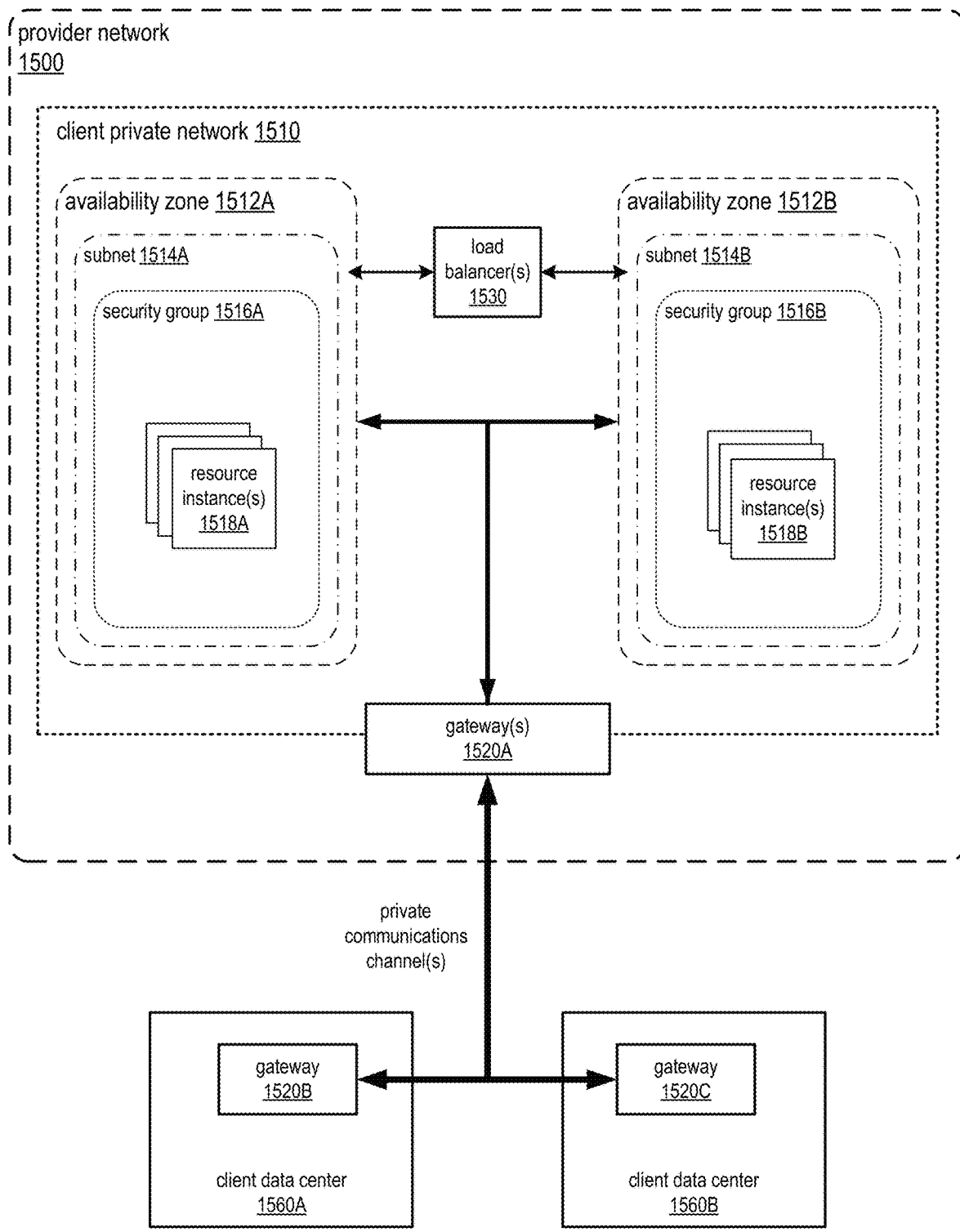
FIG. 19 illustrates an example client private network implementation across availability zones of a provider network, according to at least some embodiments.

FIG. 19 illustrates an example client private network implementation across availability zones of a provider network, according to at least some embodiments. FIG. 19 shows the architecture of the private network from the client's perspective. In this example, the client has two separate data centers 1560A and 1560B. Data centers 1560A and 1560B each include a gateway (1520B and 1520C, respectively) that is coupled to the client's private network 1510 on provider network 1500 via gateway(s) 1520A, for example via a private communications channel such as a virtual private network (VPN) connection. The client's private network 1510 is subdivided into two availability zones 1512A and 1512B. Each availability zone 1512 includes one or more subnets 1514. Resource instances 1518 within each availability zone 1512 may be grouped into one or more security groups 1516. Note again that a security zone 1516 may extend across two or more subnets 1514 in an availability zone 1512. Gateway 1520 and other virtual or physical components of the client private network 1510 (e.g., load balancers 1530 and virtual routers, not shown) may act to direct or distribute network traffic received from data centers 1560 to target virtual resource instances 1518 on the subnets 1515 in the appropriate availability zones 1512.

Figure 20:
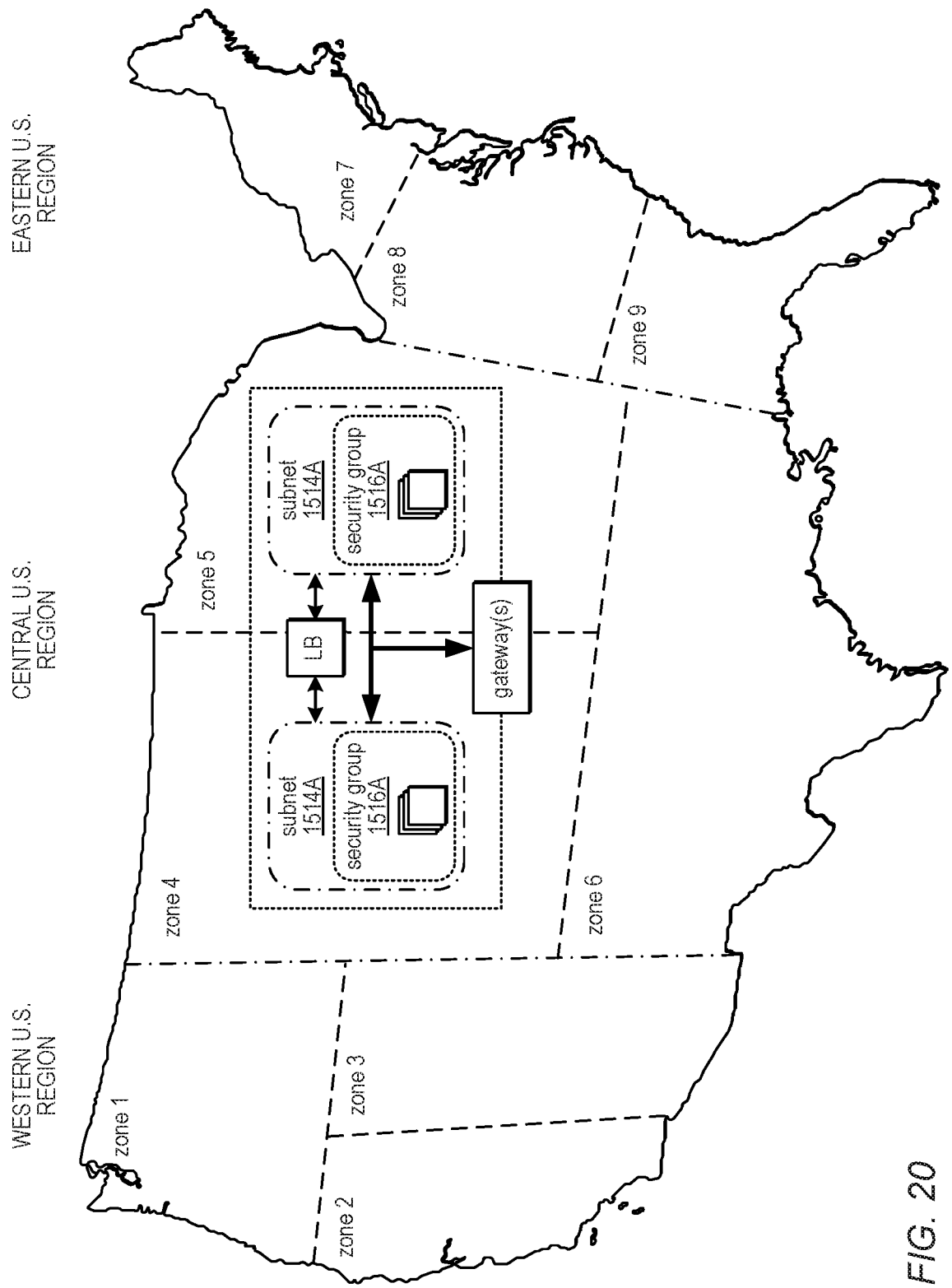
FIG. 20 illustrates an example client private network diagram overlaid on a geographic map indicating geographic regions and availability zones of a provider network, according to at least some embodiments.

FIG. 20 illustrates an example client private network diagram overlaid on a geographic map indicating example geographic regions and availability zones in an example provider network, according to at least some embodiments. A display similar to this may be provided by at least some embodiments of the network visualization service to help the client visualize the geographical distribution of the client's resources on the provider network. The example map of FIG. 20 shows the provider network as divided into three regions: a western U.S. region, a central U.S. region, and an eastern U.S. region. Each region includes three availability zones. A client private network diagram of the example client private network 1510 shown in FIG. 19 is shown overlaid on availability zones 4 and 5 in the central U.S. region to indicate that subnet 1514A is implemented in availability zone 4 and subnet 1514B is implemented in availability zone 5. Note that the example shown in FIG. 20 is not intended to be limiting.

Illustrative System

In at least some embodiments, a server that implements a portion or all of one or more of the technologies, including but not limited to the various service provider and provider network methods and apparatus including but not limited to the network visualization service and the dynamic and interactive client private network diagrams provided thereby as described herein, may include a general-purpose computer system that includes or is configured to access one or more computer-accessible media, such as computer system 2000 illustrated in FIG. 21. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider and provider network methods including but not limited to a network visualization service and the dynamic and interactive client private network diagrams provided thereby in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 19, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 19 for implementing embodiments of service provider and provider network methods and apparatus including but not limited to a network visualization service and the dynamic and interactive client private network diagrams provided thereby in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A provider network, comprising:
one or more hardware computing devices configured to implement a network visualization process configured to:
receive a request from a client for a network diagram of a client configuration of a virtual private network (VPN) that includes client resource instances including at least a first client resource instance and a second client resource instance implemented within a provider network;
responsive to the request, generate, from information related to the client configuration, a graphical representation of the client configuration, wherein the graphical representation comprises:
a plurality of graphical icons including a first graphical icon representing the first client resource instance, a second graphical icon representing the second client resource instance, and one or more additional icons representing respective connections to or between the client resource instances; and
a security group visible boundary that visually isolates the first graphical icon from the second graphical icon, wherein visually isolating the first and second graphical icons represents that the first client resource instance is in a first security group of the VPN and the second client resource instance is in a second security group of the VPN, wherein the first and second security groups are each configured to act as a firewall that controls traffic permitted to reach those client resource instances that are within the security group; and
send the graphical representation of the client configuration to a display-enabled device for display on the display-enabled device.

2. The provider network as recited in claim 1, wherein the network visualization process is further configured to:
obtain an indication of a change to the client configuration on the provider network; and
update the displayed graphical representation on the client device according to the indicated change.

3. The provider network as recited in claim 1, wherein the network visualization process is further configured to:
receive, from the client device, a request for additional information regarding a particular client resource instance or connection represented by a particular graphical icon of the plurality of graphical icons in the graphical representation; and
in response to the request, display the additional information to the client device.

4. The provider network as recited in claim 1, wherein the network visualization process is further configured to:
receive, from the client device, an indication of a user interface event that modifies the displayed graphical representation of the client configuration; and
in response to the user interface event, direct one or more provider network processes of the provider network to modify the client configuration on the provider network according to the modification to the displayed graphical representation.

5. The provider network as recited in claim 1, wherein the client resource instances are distributed in the client configuration according to logical groupings, and wherein the network visualization process is further configured to graphically indicate the logical groupings of the client resource instances in the graphical representation.

6. The provider network as recited in claim 1, wherein the provider network is partitioned into at least two network zones, and wherein the network visualization process is further configured to graphically indicate distribution of the client resource instances in the client configuration across two or more of the network zones in the graphical representation.

7. A method, comprising:
receiving a request from a client for a network diagram of a client configuration of a virtual private network (VPN) that includes two or more virtualized resource instances implemented within a provider network;
responsive to the request, generating, from information related to the client configuration, a graphical representation of the client configuration, wherein the graphical representation comprises:
a plurality of graphical icons, each representing a respective virtualized resource instance or a respective connection to or between the virtualized resource instances; and
a security group visible boundary that visually isolates one or more ones of the graphical icons from one or more others of the graphical icons, wherein different ones of the visually isolated graphical icons are representative of a corresponding virtualized resource instance that is in a corresponding security group of the VPN, or are representative of a corresponding connection to or within the corresponding security group, wherein the security group is configured to act as a firewall that controls traffic permitted to reach those virtualized resource instances that are within the security group; and
sending the graphical representation of the client configuration to a display-enabled device for display on the display-enabled device.

8. The method as recited in claim 7, further comprising:
obtaining an indication of a change to the client configuration on the provider network; and
updating the displayed graphical representation on the display-enabled device according to the indicated change.

9. The method as recited in claim 7, further comprising:
receiving a request for additional information regarding a particular virtualized resource instance or connection represented by a corresponding graphical icon of the plurality of graphical icons in the graphical representation; and
in response to the request, displaying the additional information to the display-enabled device.

10. The method as recited in claim 7, further comprising:
receiving an indication of a user interface event modifying the displayed graphical representation of the client configuration of the VPN; and
in response to the user interface event, directing at least one provider network process of the provider network to modify the client configuration of the VPN on the provider network, according to the modification of the displayed graphical representation.

11. The method as recited in claim 7, wherein the provider network is partitioned into at least two availability zones, the method further comprising graphically indicating distribution of the virtualized resource instances in the client configuration of the VPN across two or more of the availability zones in the graphical representation.

12. The method as recited in claim 7, wherein the provider network is partitioned into at least two geographic regions, each of the at least two geographic regions including at least one availability zone, the method further comprising graphically indicating, in the graphical representation, distribution of the virtualized resource instances in the client configuration of the VPN within the corresponding geographic regions and the corresponding availability zones.

13. The method as recited in claim 7, wherein the client configuration is partitioned into two or more subnetworks, wherein each virtualized resource instance is included in one of the subnetworks, the method further comprising graphically indicating in the graphical representation, the subnetworks of the client configuration of the VPN.

14. A non-transitory computer-accessible storage medium storing program instructions computer-executable to implement a network visualization service on a provider network, the network visualization service is configured to:
receive a request from a client for a network diagram of a client configuration of a virtual private network (VPN) that includes two or more virtualized resource instances implemented within a provider network;
responsive to the request, generate, from information related to the client configuration, a graphical representation of the client configuration, wherein the graphical representation comprises:
a plurality of graphical icons, each of which represents a respective virtualized resource instance or a respective connection to or between the virtualized resource instances; and
a security group visible boundary that visually isolates one or more ones of the graphical icons from one or more others of the graphical icons, wherein different ones of the one or more visually isolated graphical icons are representative of a corresponding virtualized resource instance that is in a corresponding security group of the VPN or are representative of a corresponding connection to or within the corresponding security group, wherein the security group is configured to act as a firewall that controls traffic permitted to reach those virtualized resource instances that are within the security group; and
send the graphical representation of the client configuration of the VPN to a display-enabled device for display on the display-enabled device.

15. The non-transitory computer-accessible storage medium as recited in claim 14, wherein the network visualization service is accessible by various clients of the provider network to obtain one of the one or more virtualized resource instances as a corresponding one of one or more client resource instances of a respective client and to establish corresponding virtualized private network configurations of the respective client on the provider network.

16. The non-transitory computer-accessible storage medium as recited in claim 14, wherein the network visualization service is further configured to:
detect indications of changes to the VPN on the provider network; and
update the displayed graphical representation on the display-enabled device according to the detected changes.

17. The non-transitory computer-accessible storage medium as recited in claim 14, wherein the network visualization service is further configured to collect and display additional information related to particular virtualized resource instances or connections represented by corresponding graphical icons of the plurality of graphical icons in the graphical representation in response to user interface events on the display-enabled device.

18. The non-transitory computer-accessible storage medium as recited in claim 14, wherein the network visualization service is further configured to modify the client configuration of the VPN on the provider network in response to user interface events on the display-enabled device.

19. The non-transitory computer-accessible storage medium as recited in claim 14, wherein the provider network is partitioned into at least two availability zones, wherein the network visualization service is further configured to indicate distribution of the virtualized resource instances in the VPN across two or more of the availability zones in the graphical representation.

20. The non-transitory computer-accessible storage medium as recited in claim 14, wherein the provider network is partitioned into at least two geographic regions, each geographic region including at least one availability zone, wherein the network visualization service is further configured to indicate distribution of the virtualized resource instances in the VPN within the respective geographic regions and the availability zones in the graphical representation.

* * * * *